United States Patent
Choi et al.

(10) Patent No.: US 10,437,486 B2
(45) Date of Patent: Oct. 8, 2019

(54) METHOD AND APPARATUS FOR TENANT-AWARE STORAGE SHARING PLATFORM

(71) Applicant: Samsung Electronics Co., Ltd., Suwon-si, Gyeonggi-do (KR)

(72) Inventors: Inseok Stephen Choi, Redwood City, CA (US); Yang Seok Ki, Palo Alto, CA (US); Byoung Young Ahn, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 37 days.

(21) Appl. No.: 15/227,955

(22) Filed: Aug. 3, 2016

(65) Prior Publication Data

US 2017/0344285 A1  Nov. 30, 2017

Related U.S. Application Data

(60) Provisional application No. 62/341,063, filed on May 24, 2016.

(51) Int. Cl.
*G06F 3/06* (2006.01)

(52) U.S. Cl.
CPC ........... *G06F 3/0619* (2013.01); *G06F 3/065* (2013.01); *G06F 3/0605* (2013.01); *G06F 3/067* (2013.01); *G06F 3/0631* (2013.01); *G06F 3/0665* (2013.01); *G06F 3/0688* (2013.01); *G06F 3/0689* (2013.01); *G06F 3/0601* (2013.01)

(58) Field of Classification Search
None
See application file for complete search history.

(56) References Cited

U.S. PATENT DOCUMENTS

| | | |
|---|---|---|
| 6,493,656 B1 | 12/2002 | Houston et al. |
| 2003/0200390 A1 | 10/2003 | Moore et al. |
| 2004/0117580 A1* | 6/2004 | Wu ............... G06F 11/2089 711/170 |
| 2004/0215883 A1* | 10/2004 | Bamford ......... G06F 17/3048 711/129 |
| 2006/0259686 A1 | 11/2006 | Sonobe |
| 2009/0070547 A1 | 3/2009 | Jeong et al. |
| 2009/0238078 A1 | 9/2009 | Robinson et al. |

(Continued)

OTHER PUBLICATIONS

Colgrove, John, et al., "Purity: Building Fast, Highly-Available Enterprise Flash Storage from Commodity Components", Proceedings of the 2015 ACM SIGMOD International Conference on Management of Data, ACM, 2015, 12 pages.

(Continued)

*Primary Examiner* — Brian R Peugh
(74) *Attorney, Agent, or Firm* — Renaissance IP Law Group LLP

(57) ABSTRACT

A Tenant-Aware Storage-Sharing Engine (TASTE) (225) is described. The TASTE (225) may include storage (510) for information about a set of available storage devices (705, 710) at a data center (105). A reception logic 505) may receive storage device requirements (415) from a tenant (145, 230). Selection logic (515) may then select a subset of the available storage devices (705, 710) that satisfies the storage device requirements 415) of the tenant (145, 230).

31 Claims, 14 Drawing Sheets

(56) References Cited

U.S. PATENT DOCUMENTS

| | | | |
|---|---|---|---|
| 2011/0066837 A1* | 3/2011 | Lee | G06F 9/4401 |
| | | | 713/2 |
| 2011/0296052 A1 | 12/2011 | Guo et al. | |
| 2012/0005236 A1 | 1/2012 | Deng et al. | |
| 2012/0188249 A1 | 7/2012 | Kretz et al. | |
| 2012/0254581 A1 | 10/2012 | Kim | |
| 2013/0031559 A1 | 1/2013 | Alicherry | |
| 2013/0086303 A1* | 4/2013 | Ludwig | G06F 21/00 |
| | | | 711/103 |
| 2013/0227563 A1 | 8/2013 | McGrath | |
| 2013/0297907 A1* | 11/2013 | Ki | G06F 12/0684 |
| | | | 711/170 |
| 2014/0089278 A1 | 3/2014 | Lovinger et al. | |
| 2014/0181595 A1 | 6/2014 | Hoang et al. | |
| 2014/0258535 A1 | 9/2014 | Zhang | |
| 2015/0134879 A1* | 5/2015 | Zheng | G06F 17/30575 |
| | | | 711/103 |
| 2015/0178191 A1 | 6/2015 | Camp et al. | |
| 2015/0379420 A1 | 12/2015 | Basak et al. | |
| 2016/0004449 A1 | 1/2016 | Lakshman et al. | |
| 2016/0070480 A1* | 3/2016 | Babu | G06F 3/0608 |
| | | | 711/114 |
| 2016/0139838 A1* | 5/2016 | D'Sa | G06F 3/0619 |
| | | | 711/114 |
| 2016/0259586 A1 | 9/2016 | Tylik et al. | |
| 2016/0292025 A1 | 10/2016 | Gupta et al. | |
| 2016/0337202 A1 | 11/2016 | Ben-Itzhak et al. | |
| 2016/0378356 A1* | 12/2016 | Colgrove | G06F 3/0611 |
| | | | 711/114 |
| 2017/0123852 A1 | 5/2017 | Chagalakondu et al. | |

OTHER PUBLICATIONS

Dirik, Cagdas, et al., "The Performance of PC Solid-State Disks (SSDs) as a Function of Bandwidth, Concurrency, Device Architecture, and System Organization," ISCA 2009, Jun. 20-24, 2009, ACM SIGARCH Computer Architecture News. vol. 37. No. 3. ACM, 2009.

Meng, Xiaoqiao, et al., "Improving the Scalability of Data Center Networks with Traffic-aware Virtual Machine Placement," INFOCOM, 2010 Proceedings IEEE, 9 pages.

Final Office Action for U.S. Appl. No. 15/225,811, dated Jul. 10, 2018.

Office Action for U.S. Appl. No. 15/222,938, dated Jul. 27, 2018.

Final Office Action for U.S. Appl. No. 15/222,938, dated Feb. 27, 2019.

Office Action for U.S. Appl. No. 15/225,811, dated Jan. 2, 2019.

Notice of Allowance for U.S. Appl. No. 15/222,938, dated May 22, 2019.

Notice of Allowance for U.S. Appl. No. 15/225,811, dated Jul. 8, 2019.

* cited by examiner

METHOD AND APPARATUS FOR TENANT-AWARE STORAGE SHARING PLATFORM

RELATED APPLICATION DATA

This application claims the benefit of U.S. Provisional Patent Application Ser. No. 62/341,063, filed May 24, 2016, which is incorporated by reference herein for all purposes.

This application is related to U.S. patent application Ser. No. 15/222,938, filed Jul. 28, 2016, which claims the benefit of U.S. Provisional Patent Application Ser. No. 62/341,057, filed May 24, 2016, both of which are incorporated by reference herein for all purposes.

This application is related to U.S. patent application Ser. No. 15/225,811, filed Aug. 1, 2016, which claims the benefit of U.S. Provisional Patent Application Ser. No. 62/341,059, filed May 24, 2016, both of which are incorporated by reference herein for all purposes.

This application is related to U.S. Provisional Patent Application Ser. No. 62/352,509, filed Jun. 20, 2016, which is incorporated by reference herein for all purposes.

FIELD

The inventive concepts relate generally to Solid State Drives (SSDs), and more particularly to managing SSDs in a data center responsive to application requirements.

BACKGROUND

Storage devices, particularly Solid State Drives (SSDs), exhibit continuously-changing characteristics over time. SSDs may have unpredictable latency and/or bandwidth due to the underlying software (i.e., firmware) and/or hardware inside the SSD. Prolonged access latency (read/program/erase) due to wear leveling may also affect latency and/or bandwidth. Virtual abstraction—that is, different approaches such as polymorphic SSDs, open-channel SSDs, and light-NVM (a subsystem that supports open-channel SSDs), to name a few—make it hard to predict an SSD's performance characteristics. Finally, different cell densities—such as Single Level Cell (SLC), Multi-Level Cell (MLC), Three Level Cell (TLC), and Quadruple Level Cell (QLC), to name a few—cause quite different characteristics.

Data centers require a mechanism to map applications and storage devices. Storage devices have many characteristics which may change over time and therefore should be monitored. On the other hand, applications may also have different requirements, such as degrees of redundancy, parallelism, persistency, security, Flash Translation Layer (FTL) parameters (cluster size, page size, etc.), and so on. But conventional storage management uses either volume management or Redundant Array of Independent Disks (RAID)-like approaches, which are not aware of the performance characteristics of newer storage devices, such as SSDs, or the requirements of applications (for example, Hadoop Distributed File System (HDFS) or key-value storage).

A need remains for a way to select storage devices to store data for applications responsive to the applications' requirements.

DETAILED DESCRIPTION

Figure 1:
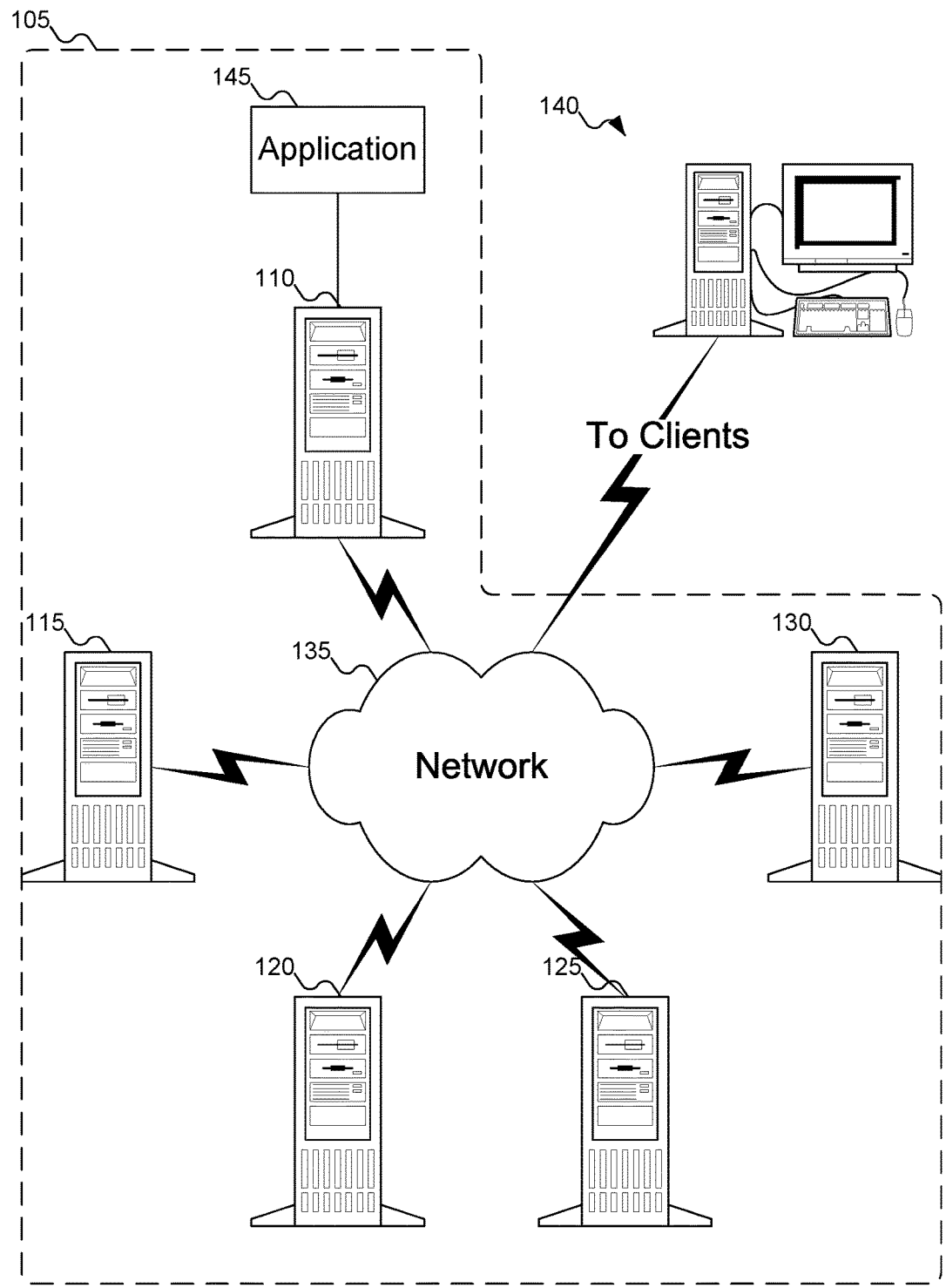
FIG. 1 shows a data center with various host machines, communicating with a client machine.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Large-scale data center storage infrastructure systems may benefit from an ability to predict latency and bandwidth between any pair of storages (or between host and storage device), or among any set/cluster of storage devices. The maximum latency or the minimum bandwidth among storage devices may be important in selecting or establishing one or more virtual storage devices to support an application. Moreover, there are increasing demands for more performance information because large-scale datacenters try to manage and decide many different aspects of storage including parallelism, replication, isolation, and so on. Such a predictor should not be based on on-demand or per-pair measurement, because such approaches do not scale.

Unfortunately, existing storage modeling based on specifications or profiling might not satisfy such demands. This is because Solid State Drive (SSD)-based storages often exhibit heterogeneous latency/bandwidth and time-varying characteristics due to aging/wearing-out and hidden characteristics such as the Flash Translation Layer (FTL), despite the storage devices themselves being of identical manufacture and even physical age.

Another obstacle to predict storage distance—that is, the performance characteristics related to the distance between a pair of storage devices within a data center—is that pair-wise prediction requires too many measurements (considering all-to-all connections).

U.S. patent application Ser. No. 15/222,938, filed Jul. 28, 2016, and Ser. No. 15/225,811, filed Aug. 1, 2016, both of which are incorporated by reference herein for all purposes, provide partial solutions to these problems. But there are other approaches to consider.

Flash-based storage systems have asymmetric performance characteristics. That is, a read takes 5-25 microseconds (µs), but a write takes 100-200 µs, and erasing a flash blocks may take a few milliseconds (ms). Moreover, typically the number of program/erasure cycle a flash cell may endure is limited. As a result, Wear Leveling may be utilized (and considered as a performance characteristic). Furthermore, Garbage Collection takes a significant number of cycles, during which all input/output (I/O) operations could be blocked.

Moreover, a traditional approach, such as embedded Flash Translation Layer (FTL) or FTL-per physical device, could be wasteful, considering the various demands and characteristics of an application. Two representative examples are Hadoop Distributed File System (HDFS) and Key-Value (KV)-Store. HDFS usually uses a large block size (64 megabytes (MB) in many cases), while KV-Stores use a small block size (e.g., 100 bytes (B) data for Facebook workloads). In this case, KV-Store's FTL overhead (data structure memory foot print and PBA mappings) may be 640,000 times greater than HDFS's FTL overhead. Put another way, from the memory footprint perspective, assuming the same mapping scheme, one KV-Store storage device's FTL could handle the FTL of 640,000 HDFS storage devices. It would be helpful to generate a cluster of storages which may be mapped to FTLs with differing capabilities to optimize efficiency and to eliminate hidden FTL latency.

A storage distance graph/tree may combine a topology graph/tree with per-storage performances. This approach takes advantage of the fact that topologies seldom change as compared with the variation/changes of storage performances. In particular, FTL's unpredictable latency should be avoided in Service Level Objectives (SLOs).

A new Tenant-Aware Storage-sharing Engine (TASTE) may take multiple inputs. One input to TASTE may be from storage resource information with embedded information (such as latency, bandwidth, topology, distances between storages, and so on). A second input to TASTE may be a tenant's (application's) specification, along with the application's requirements. TASTE may provide a cluster (set of storages) to satisfy the application's requirements. Moreover, TASTE may provide sub-clusters with FTL mappings along with FTL page size and persistency. In addition, TASTE may also implement partial requirements of given applications, such as redundancy, parallelism, and security. Finally, TASTE may provide for dynamic pool control. For example, data migration may be supported for load balancing, capacity provisioning, etc.

FTL Cluster Mappings

TASTE may be aware of storage resource pools. For example, TASTE may distinguish high performance storage devices from low performance storage devices, as well as the proximity between storages (local or remote, and distance). Assume for example that two tenants (applications) now request storage for HDFS and KV-Store, respectively.

As we discussed earlier, HDFS's FTL could be a relatively small-footprint mapping because of its larger page granularity. Therefore, multiple storage devices (either virtual or physical) may be clustered to form another virtual storage device that actually comes with its own FTL with Logical Block Address (LBA) interfaces.

Unlike HDFS, KV-Store services not only require higher performance storages, but the FTL's footprint is much larger than the FTL footprint of HDFS. Therefore, TASTE may allocate fewer but higher performance storage devices to form an FTL cluster for KV-Store usage.

FTL Page Size

For an example comparison, HDFS may have 64 MB pages across its cluster. But the KV-Store may have different page size according to the KV pair placements; for example, 100 B, 32 kilobytes (KB), and 2 MB.

Replication Factor

TASTE may also provide a certain degree of replication from the resource management perspective. For example, each storage device in a cluster may be mirrored by other storage devices. The FTL layer may control data replication.

An application may have both inter-node and inter-rack replication requirements (that is, data needs to be copied to a different storage device and a storage device in a different node to prevent data loss due to node failure or power failure of the same node or the same rack). Such context should be known to the resource manager, too. TASTE may provide an Application Program Interface (API) to exchange such requirements, enabling TASTE to provide replication over within a node. As a result, for example, HDFS may free from one replication factor and need to focus on inter-rack replication only if the target replication factor is three. Alternatively or additionally, TASTE may manage inter-rack replication as well as intra-rack replication.

Parallelism

Some tenants might be sensitive to latency and bandwidth together, but no individual available physical storage device might provide sufficient performance to meet their requirements. In that case, TASTE may generate a new virtual storage device that meets the application's requirement. The new virtual storage device may exhibit a higher aggregate bandwidth while reducing latency in large volume I/O, which may reduce queue delays.

Dynamic Resource Pool Control

As we discussed earlier, storage pools might need to be updated due to performance characteristic changes over time, capacity provisioning, load balancing, etc. Migration is one way to address dynamic pool control. TASTE may migrate data regardless of the type of storage device used to store the data: physical, virtual, part of an FTL-cluster, a whole FTL-cluster, etc. Migration is possible because TASTE is aware of its underlying storage type and FTL implementation.

FIG. 1 shows a data center with various host machines, communicating with a client machine. In FIG. 1, data center 105 is shown as including host machines 110, 115, 120, 125, and 130. More detail about host machines 110, 115, 120, 125, and 130 is shown with reference to FIGS. 2-3 below. Data center 105 may also include network 135 that permits host machines 110, 115, 120, 125, and 130 to communicate with each other and with client machines 140. Network 135 may be any variety of network, including a Local Area Network (LAN) or a Wide Area Network (WAN). Network 130 may use wireline technology-such as Ethernet-wireless technology-such as any of the IEEE 802.11 a/b/g/n/ac or equivalent or replacement technologies- or a combination of the two. In addition, while FIG. 1 suggests that host machines 110, 115, 120, 125, and 130 are located within a single geographic area, in other embodiments of the inventive concept host machines 110, 115, 120, 125, and 130 may be geographically dispersed and interconnected using a global network, such as the Internet (possibly using an overlay network, such as a Virtual Private Network (VPN)).

Host machine 110 may support application 145. Application 145 may be an application used by client machine 140 via a Secure Shell (SSH), a web interface, or Application Program Interface (API).

While FIG. 1 shows host machines 110, 115, 120, 125, and 130 as identical and all as tower computers, embodiments of the inventive concept may support any desired formats for host machines 110, 115, 120, 125, and 130, which may all be different. For example, some host machines 110, 115, 120, 125, and 130 might be tower computers of various models and manufacture, and other host machines 110, 115, 120, 125, and 130 might be rack-mounted server of various models and manufacture. Different host machines 110, 115, 120, 125, and 130 may have different capabilities, in terms of processor capability, available memory, and available storage, all of which may be of varying formats. For example, some host machines 110, 115, 120, 125, and 130 might use Dynamic Random Access Memory (DRAM) for member memory, while others might use Persistent Random Access Memory (PRAM), Static Random Access Memory (SRAM), Ferroelectric Random Access Memory (FRAM), or Non-Volatile Random Access Memory (NVRAM), such as Magnetoresistive Random Access Memory (MRAM). Similarly, some host machines 110, 115, 120, 125, and 130 might use conventional hard disk drives for storage, while others might use flash memory (a variety of NVRAM) or MRAM. Other possibilities, whether or not enumerated here, are also within the scope of the inventive concept.

As noted above, host machines 110, 115, 120, 125, and 130 are all essentially equivalent and interchangeable. Accordingly, any reference to host machine 110 in the remainder of this document is intended to encompass any and all of host machines 110, 115, 120, 125, and 130, without limitation.

While FIG. 1 shows client machines 140 as a conventional minitower computer system, with monitor, keyboard, and mouse, client machines 140 may take any desired form, including laptop computers, tablet computers, smartphones, and any other desired technological format. In addition, while FIG. 1 shows a single client machine 140, embodiments of the inventive concept may support any number of client machines 140 simultaneously.

Figure 2:
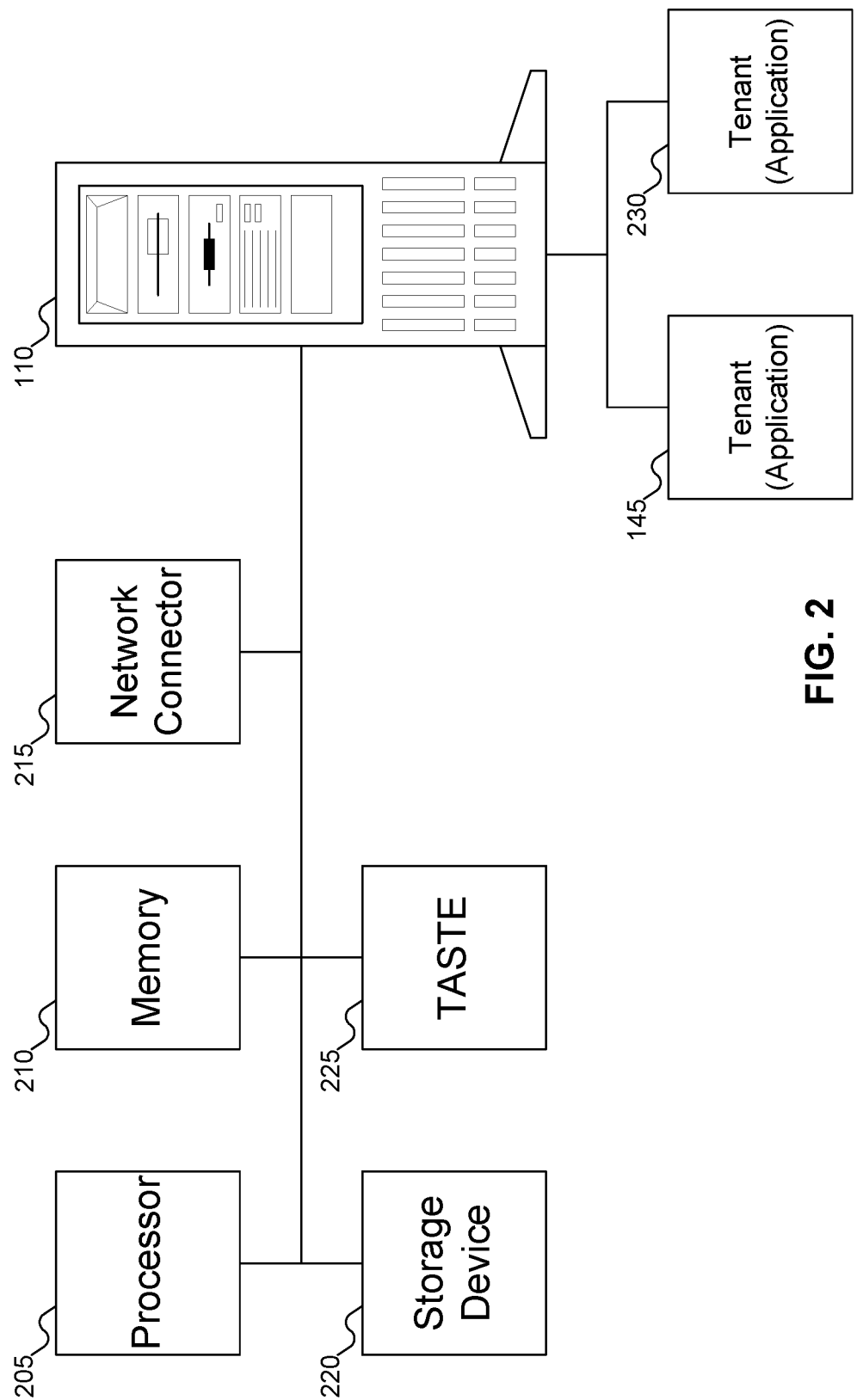
FIG. 2 shows details of a host machine of FIG. 1, according to an embodiment of the inventive concept.

FIG. 2 shows details of host machine 110 of FIG. 1, according to an embodiment of the inventive concept. In FIG. 2, host machine 110 is shown as including processor 205 (also referred to as a Central Processing Unit (CPU)), memory 210, network connector 215, and storage device 220. Processor 205 may be any variety of processor: for example, an Intel Xeon, Celeron, Itanium, or Atom processor, an AMD Opteron processor, an ARM processor, etc. As described above, memory 210 may be any variety of memory, such as flash memory, SRAM, PRAM, etc. but is typically DRAM. Network connector 215 may be any variety of connector that may connect host machine 110 to network 135 of FIG. 1: for example, an Ethernet interface or a wireless interface. Storage device 220 may be any variety of storage device that may be used by a data center. While Solid State Drives (SSDs) are one possibility for storage device 220, storage device 220 may also include other storage forms, such as hard disk drives or other long-term storage devices.

Host machine 110 may also include Tenant-Aware Storage-Sharing Engine (TASTE) 225. TASTE 225 may use information about the requirements of tenants (i.e., applications), such as tenants 145 and 230, and may manage the operation of a storage device array. While FIG. 2 shows tenants 145 and 230 as being hosted by host machine 110, embodiments of the inventive concept may support tenants hosted by machines other than host machine 110: that is, TASTE 225 may manage a storage device array for remote applications as well as local applications.

Figure 3:
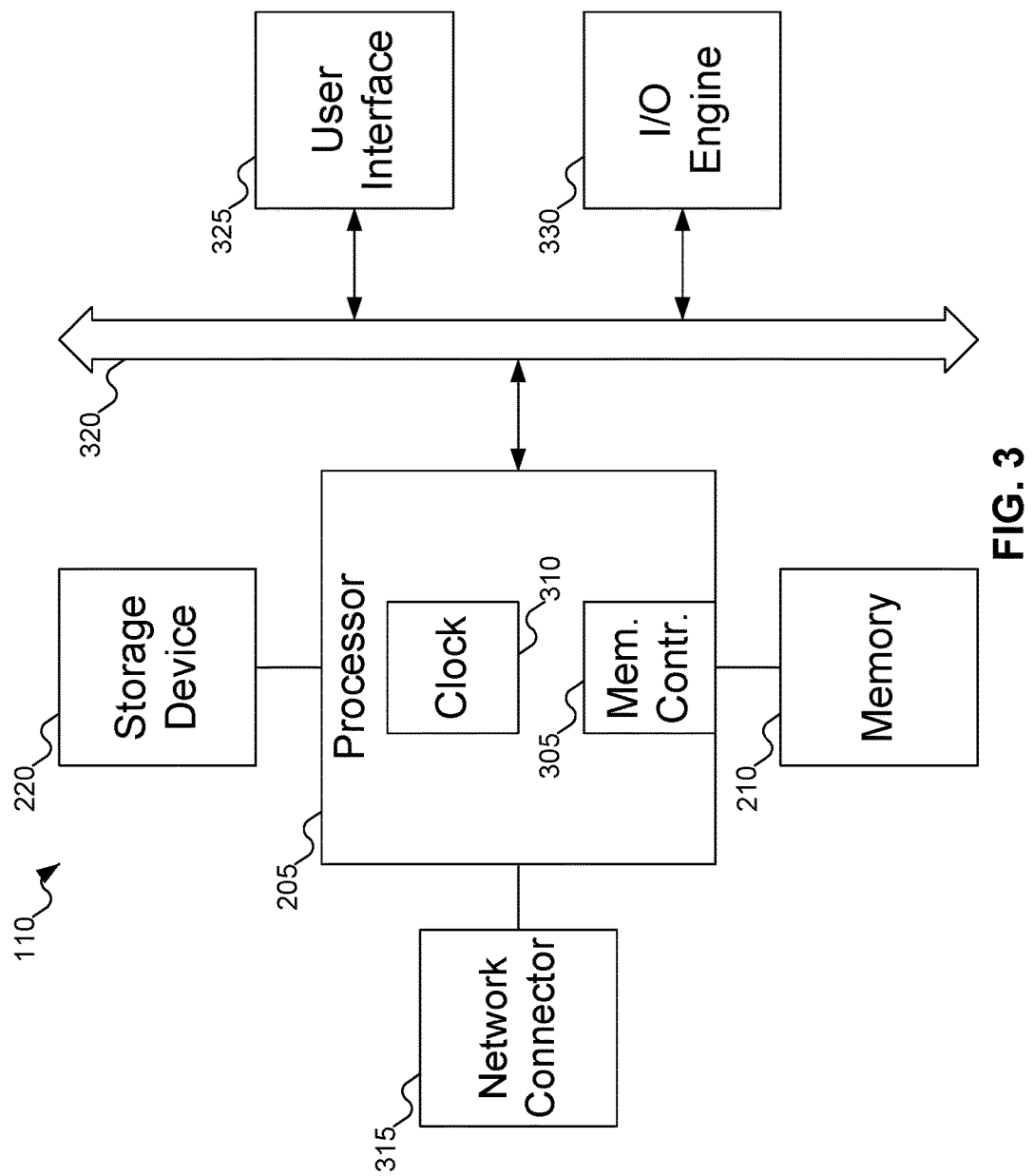
FIG. 3 shows additional details of the host machine of FIG. 1.

FIG. 3 shows additional details of host machine 110 of FIG. 1. Referring to FIG. 3, typically, machine or machines 110 include one or more processors 205, which may include memory controller 305 and clock 310, which may be used to coordinate the operations of the components of machine or machines 110. Processors 205 may also be coupled to memory 210, which may include random access memory (RAM), read-only memory (ROM), or other state preserving media, as examples. Processors 205 may also be coupled to storage devices 220, and to network connector 315, which may be, for example, an Ethernet connector or a wireless connector. Processors 205 may also be connected to a bus 320, to which may be attached user interface 325 and input/output interface ports that may be managed using input/output engine 330, among other components.

Figure 4:
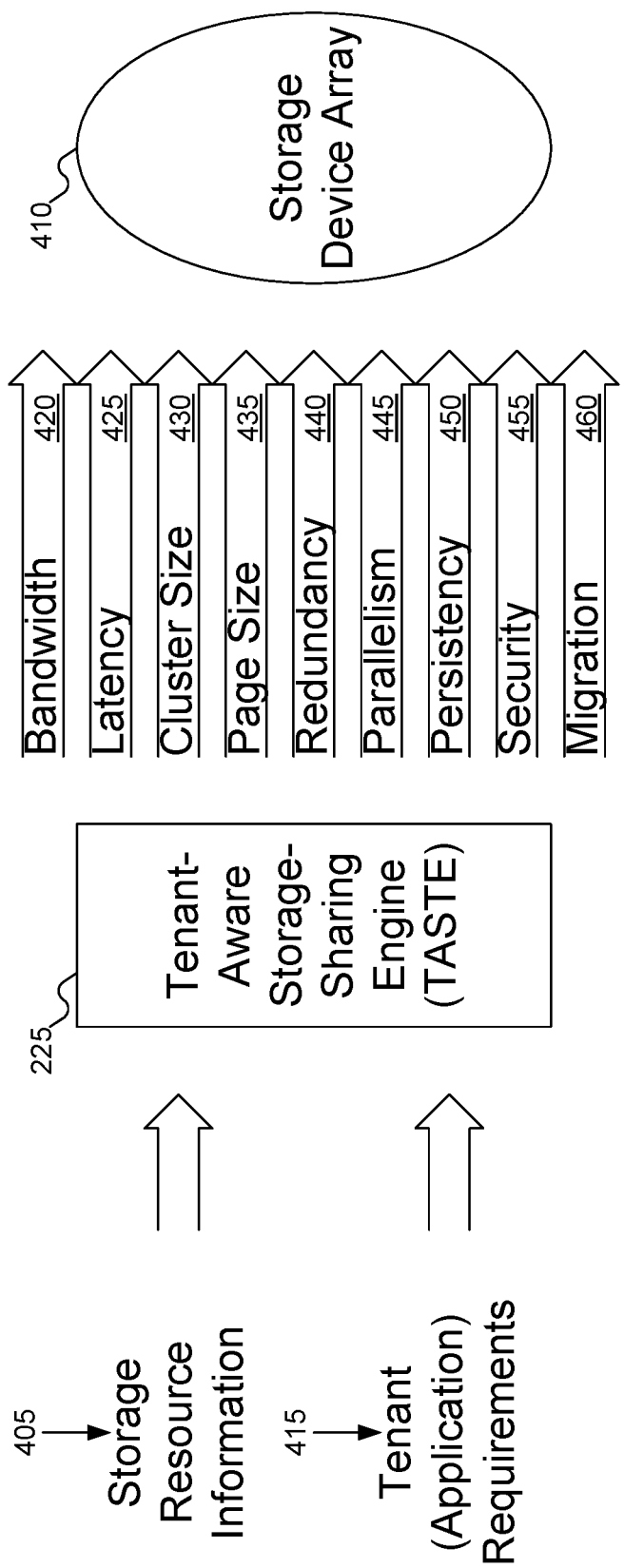
FIG. 4 shows the Tenant-Aware Storage Sharing Engine (TASTE) of FIG. 2 receiving requirements of an application and adjusting a storage array as a result.

FIG. 4 shows Tenant-Aware Storage Sharing Engine (TASTE) 225 of FIG. 2 receiving requirements of an application and adjusting a storage array as a result. In FIG. 4, TASTE 225 may receive storage resource information 405, which may be information about the storage devices in storage device array 410, and tenant requirements 415. Using this information, TASTE 225 may configure storage device array 410 to address any of a number of requirements tenants 145 and 230 of FIG. 2 might have. Such requirements may include the following (with examples provided in later figures to illustrate how these requirements may be satisfied by TASTE 225 of FIG. 2):

Bandwidth 420: a minimum bandwidth required by tenants 145 and 230 of FIG. 2. Given a minimum bandwidth requirement from tenants 145 and 230 of FIG. 2, TASTE 225 may select storage device(s) from storage device array 410 that offer the requested minimum bandwidth 420.

Latency 425: a maximum latency tolerated by tenants 145 and 230 of FIG. 2. Given a maximum latency requirement from tenants 145 and 230 of FIG. 2, TASTE 225 may select storage device(s) from storage device array 410 that offer the requested maximum latency 425.

Cluster size 430: how many individual storage devices should be assigned to support tenants 145 and 230 of FIG. 2. Given a requested cluster size, TASTE 225 may select enough storage devices to provide requested cluster size 430.

Page size 435: how large the page size for each storage device assigned to support tenants 145 and 230 of FIG. 2 should be. Given a requested page size (or requested pages sizes, since tenants 145 or 230 may request different page sizes for different storage devices in a cluster), TASTE 225 may configure the various storage devices in the cluster to use requested page size(s) 435.

Redundancy 440 (which may also be called a replication factor): how many copies of each datum should be stored within storage device array 410 for tenants 145 and 230 of FIG. 2. Given a requested redundancy, TASTE 225 may select enough storage devices to provide required redundancy 440.

Note that redundancy 440 and cluster size 430 are different (if related) concepts. If tenants 145 and 230 of FIG. 2 specify cluster size 430 of three, they are only requesting that three storage devices be included in the cluster. If tenants 145 and 230 of FIG. 2 specify redundancy 440 of three, they are requesting that each datum be stored on three different storage devices. Therefore, the cluster size for tenants 145 and 230 of FIG. 2 would need to be at least three (since there have to be at least three different storage devices to store three copies of each datum), but the cluster size could be higher. Another way to understand the difference between cluster size 430 and redundancy 440 is by comparison to the difference between Redundant Array of Independent Disks (RAID) levels 0 and 1. Raid 0 provides greater overall storage capacity (equal to the sum of the capacities of the individual disks) but no redundancy against the failure of any individual disk. RAID 1, on the other hand, protects against the possibility of failure of up to n−1 disks in an array of n disks, but provides a capacity equal to the minimum of the capacities of the individual storage disks.

Parallelism 445: combining storage devices to provide a desired degree of service for tenants 145 and 230 of FIG. 2. It might happen that tenants 145 and 230 of FIG. 2 might require a greater bandwidth and/or smaller latency than may be provided by any individual storage device in storage device array 410. In that situation, given a requested parallelism, TASTE 225 may select storage devices to provide required parallelism 445. These selected storage devices may then be combined into a virtual storage device, offering the desired bandwidth and/or latency.

Note that although parallelism 445 has some overlap with bandwidth 420 and latency 425, there are differences. For example, if tenants 145 and 230 of FIG. 2 specify requirements of bandwidth 420 and/or latency 425 but no individual storage device within storage device array 410 may provide required bandwidth 420 and/or latency 425, TASTE 225 may return a failure to satisfy the requirements, without attempting to invoke parallelism. Tenants 145 and 230 of FIG. 2 may then decide if they would be satisfied with lesser requirements or if they want to establish a requirement of parallelism 445 as well. (Of course, if no individual storage device in storage device array 410 may satisfy the requirements of bandwidth 420 and/or latency 425, TASTE 225 could automatically apply an additional requirement of parallelism 445, if desired).

Persistency 450: either how long data for tenants 145 and 230 of FIG. 2 should remain on storage devices before being erased, or that data may survive a power failure (or both). Tenants 145 and 230 of FIG. 2 might want their data to remain on their storage devices for some minimum amount of time, and not be erased due to aging (that is, their data should not be deleted just because it has been stored for some minimum amount of time). TASTE 225 may configure the storage devices in storage device array 410 supporting tenants 145 and 230 of FIG. 2 to retain data for a specified amount of time. For example, applications using a key-value store for data that is accessed sporadically might want to guarantee that the data will not be invalidated too soon. TASTE 225 may select storage devices that will not invalidate data for a specified length of time, after which the data may be subject to invalidation/garbage collection.

Alternatively, tenants 145 and 230 of FIG. 2 might want to be sure that data may survive a power failure. Using non-volatile storage (which may retain data when power is turned off) may be part of the solution. But persistency may also require the ability to ensure that data is confirmed as written to the storage device despite a power failure. For example, a storage device might store data in a buffer in DRAM, and only write the data to storage when there is a pre-determined amount of data to be written. If there is a power failure before the buffered data is written to long-term storage, the data in the buffer would be lost. To address this problem, an application requesting persistency may map the application to a persistency-guaranteed FTL and physical device, such as an SSD with embedded high-capacity capacitors, which prevents data loss even at a sudden power loss.

Security 455 (which may also be termed isolation): data for one particular tenant should be stored on different storage devices in storage device array 410 than one or more other tenants. For example, tenant 145 of FIG. 2 might specify that its data should not be stored on the storage device as data for tenant 230 of FIG. 2. TASTE 225 may select a storage device within storage device array 410 that isolates the data of tenant 145 of FIG. 2 from one or more other specified tenants.

Migration 460: data for a tenant should be moved from one storage device to another within storage device array 410. Tenants 145 and 230 of FIG. 2 might request that data be migrated from one storage device in storage device array 410 to another storage device. Or, TASTE 225 might decide to migrate data for tenants 145 and 230 of FIG. 2 for other reasons, such as capacity provisioning or load balancing. Either way, TASTE 225 may manage to migrate data from one storage device to another within storage device array 410.

There may also be other requirements 415 beyond what are shown in FIG. 4. For example, tenants 145 and 230 of FIG. 2 might specify that a particular amount of storage—say, 2 gigabytes (GB)—be allocated to each of them. Embodiments of the inventive concept may support any requirements 415, whether or not specifically shown in FIG. 4.

Figure 5:
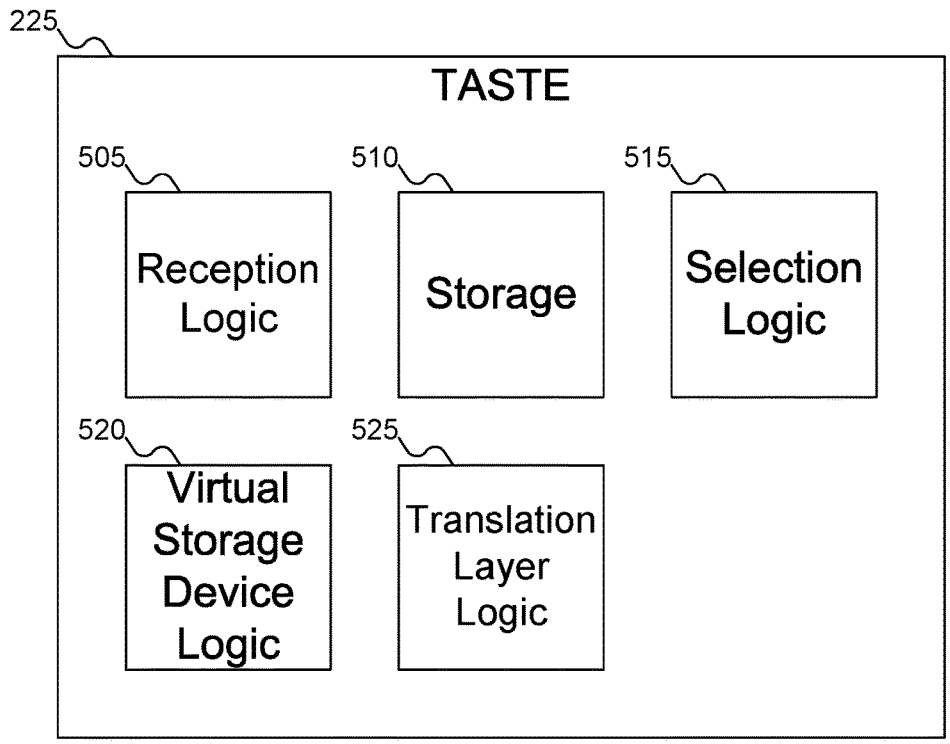
FIG. 5 shows details of the TASTE of FIG. 2.

FIG. 5 shows details of TASTE 225 of FIG. 2. In FIG. 5, TASTE 225 may include reception logic 505, storage 510, selection logic 515, virtual storage device logic 520, and translation layer logic 525. Reception logic 505 may receive information, such as storage resource information 405 of FIG. 4 and/or tenant requirement 415 of FIG. 4, from various sources, such as tenants 145 and 230 of FIG. 2. Storage 510 may store information about the storage devices in storage device array 410 of FIG. 4: which storage devices are in which nodes, what types of storage devices are available, their sizes, bandwidths, and latencies, etc. Note that what storage devices are considered "available" may vary. For example assume that tenant 145 of FIG. 2 has requested isolation from tenant 230 of FIG. 2. If tenant 230 of FIG. 2 then requests a cluster of storage devices, any storage devices assigned to tenant 145 of FIG. 2 should not be considered available for purposes of selecting a cluster for tenant 230 of FIG. 2.

Selection logic 515 may select storage devices from storage device array 410 of FIG. 4 to satisfy requirements 415 of FIG. 4 for a tenant. Virtual storage device logic 520 may "construct" a virtual storage device from one or more physical storage devices in storage device array 410 of FIG. 4. For example, if tenant requirements 415 of FIG. 4 specifies parallelism 445 of FIG. 4, virtual storage device logic 520 may "construct" a virtual storage device that provides the required bandwidth and/or latency where no physical storage device may satisfy those requirements.

Translation layer logic 525 may establish a translation layer to be used with the physical and/or virtual storage devices used to satisfy the tenant requirements. What translation layer logic 525 does may depend on what the tenant requirements are. In one embodiment of the inventive concept, if the tenant requirements include a cluster size, translation layer logic 525 may establish a translation layer to map logical addresses to physical addresses across the storage devices in the cluster size. Alternatively, if a virtual storage device is created for use by the tenant, translation layer logic 525 may establish the translation layer to appear as a single storage device to the tenant, but map addresses from that virtual storage device to the various physical storage devices that establish the virtual storage device. In another embodiment of the inventive concept, if the tenant requirements include one or more page sizes, translation layer 525 may establish a translation layer to divide the various storage devices into pages according to one of the specified page sizes. In another embodiment of the inventive concept, if the tenant requirements include a replication factor, translation layer logic 525 may establish a translation layer to map a single logical address to multiple physical addresses on various physical storage devices, to support replication across the physical storage devices. As noted above, the physical storage devices may be within a single node or across multiple nodes. In another embodiment of the inventive concept, if the tenant requirements include a persistency requirement, translation layer logic 525 may establish a translation layer that tracks how long individual datum stored on the physical storage device(s) has been unchanged, and may mark a datum for invalidation only after a threshold amount of time has passed. In addition, embodiments of the inventive concept may have translation layer logic 525 establish a translation layer that supports multiple such tenant requirements.

Figure 6:
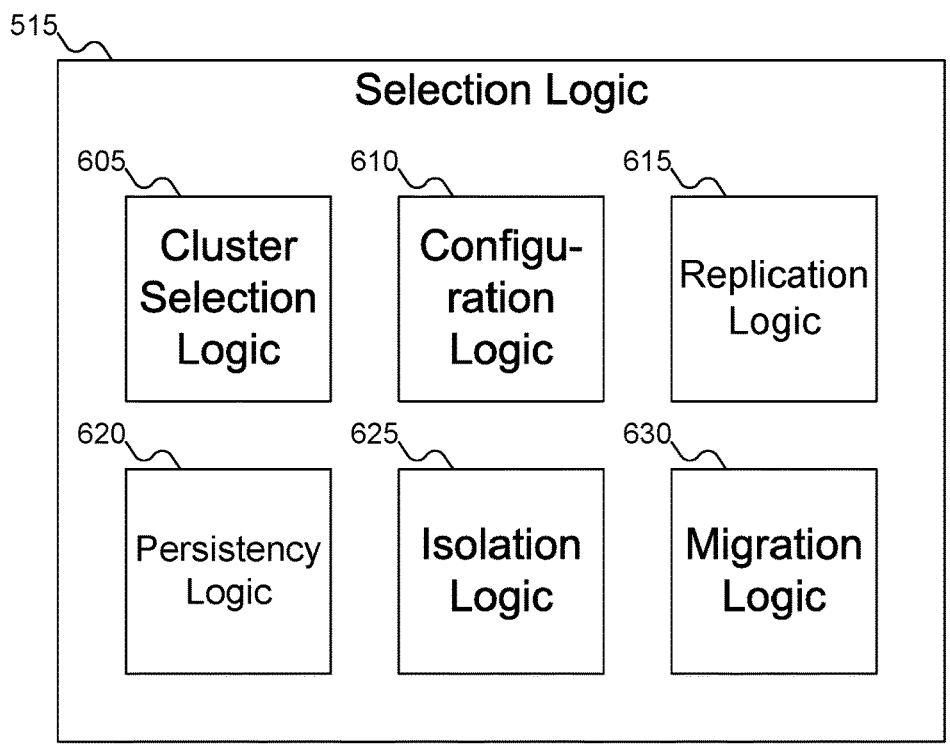
FIG. 6 shows details of the selection logic of FIG. 5.

FIG. 6 shows details of selection logic 515 of FIG. 5. In FIG. 6, selection logic 515 may include cluster selection logic 605, configuration logic 610, replication logic 615, persistency logic 620, isolation logic 625, and migration logic 630. Cluster selection logic 605 may select a cluster of storage devices from storage device array 410 to satisfy cluster size 430 of FIG. 4. Configuration logic 610 may configure one or more storage devices in storage device array 410 to use page size(s) 435 of FIG. 4. Replication logic 615 may manage replication of data across different storage devices within a node at data center 105. Persistency logic 620 may configure storage devices within storage device array 410 of FIG. 4 so that data persists for a specified minimum duration, even if the data is not accessed, or persistency logic 620 may cause selection logic 515 to select storage devices that may guarantee data may survive an unexpected power failure. Isolation logic 625 may select a storage device (or a cluster of storage devices) within storage device array 410 of FIG. 4 that does not share storage devices with one or more identified tenants. And migration logic 630 may manage the migration of data from one storage device to another within storage device array 410 of FIG. 4, either at the request of tenant 145 and/or 230 of FIG. 2 or by TASTE 225 of FIG. 2 itself.

In FIGS. 5-6, the various components are described as logics. These logics may be suitably designed circuits to achieve the desired results, or suitably modified general circuits, such as Programmable Read-Only Memory (PROM), Erasable Programmable Read-Only Memory (EPROM), Electronically Erasable Programmable Read-Only Memory (EEPROM), or any equivalent design. These logics may also be implemented using software running on an appropriate processor.

The above discussion provides some explanation of how TASTE 225 of FIG. 2 operates. But some examples might help to clarify what TASTE 225 of FIG. 2 is doing. To start, an example storage device array 410 would be helpful.

Figure 7:
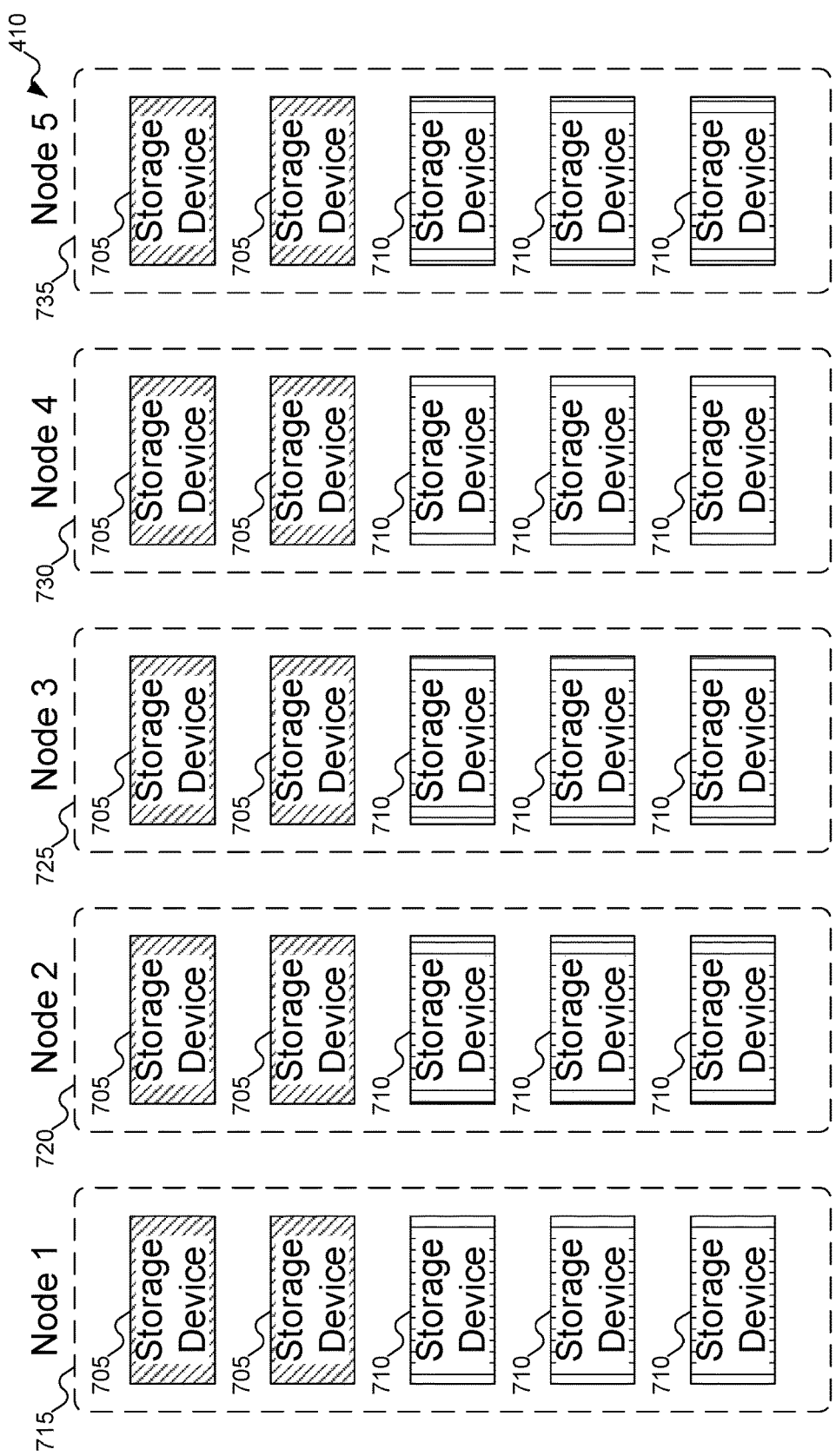
FIG. 7 shows an example of the storage device array of FIG. 4.

FIG. 7 shows an example of storage device array 410 of FIG. 4. In FIG. 7, storage device array 410 has a total of 25 storage devices. These storage devices are divided roughly into two classes of storage devices. Storage devices 705 may high performance storage devices, while storage devices 710 may be low performance storage devices. Storage devices 705 and 710 may be divided across nodes 715, 720, 725, 730, and 735, where each node may represent a single machine, or a single rack within data center 105 of FIG. 1.

While FIG. 7 shows an example of storage device array 410, embodiments of the inventive concept may support any desired configuration for storage device array 410. For example, there may be any number of nodes, not just five. Each node may have any number of storage devices, not just five. Each node may have a different number of storage devices from other nodes in storage device array 410. Each node may also have different numbers of the different types of storage devices, including zero. For example, one node might have just high performance storage devices 705, and another node might have just low performance storage devices 710. There may be more than two classes of storage devices (in FIG. 7, high performance storage devices 705 and low performance storage devices 710), and the storage devices may be categorized according to more than one criteria. And any other thread that appears to link storage devices in FIG. 7 may also be varied in other embodiments of the inventive concept.

Figure 8:
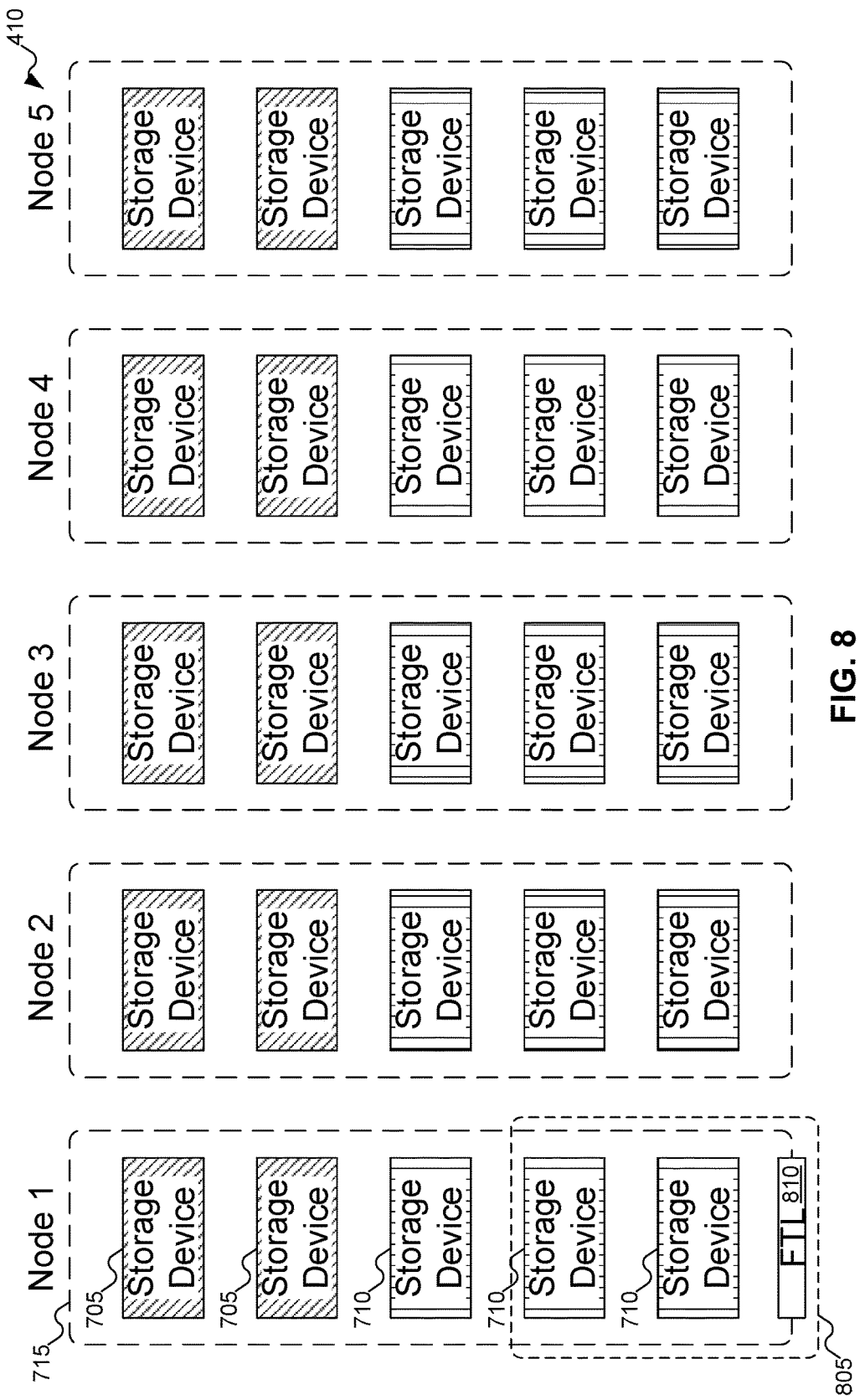
FIG. 8 shows a virtual storage device being established within the storage device array of FIG. 7.

FIG. 8 shows a virtual storage device being established within storage device array 410 of FIG. 7. In FIG. 8, tenant 145 of FIG. 2 might have specified requirements 415 of FIG. 4, identifying bandwidth 420 and/or latency 425, and parallelism 445. These requirements 415 of FIG. 4 may indicate that tenant 145 of FIG. 2 wants a particular minimum bandwidth and/or maximum latency, and if no single storage device is available that may provide these requirements, that TASTE 225 of FIG. 2 may construct a virtual storage device to meet these requirements. Further assume that no single storage device in storage device array 410 may satisfy these requirements. Therefore, TASTE 225 of FIG. 2 may construct virtual storage device 805 from two storage devices in node 715. In FIG. 8, TASTE 225 may use information about tenant 145 of FIG. 2 to know that low performance storage devices 710 will suffice for tenant 145 of FIG. 2; but if tenant 145 of FIG. 2 needed support from high performance storage devices 705, TASTE 225 of FIG. 2 could construct virtual storage device 805 from high performance storage devices 705.

Because virtual storage device 805 may represent a new flash storage device (such as an SSD), virtual storage device 805 may include its own Flash Translation Layer (FTL) 810. FTL 810 may manage the mapping between logical block addresses, as used by tenant 145 of FIG. 2, and the physical block addresses used by the storage devices that comprise virtual storage device 805.

Figure 9:
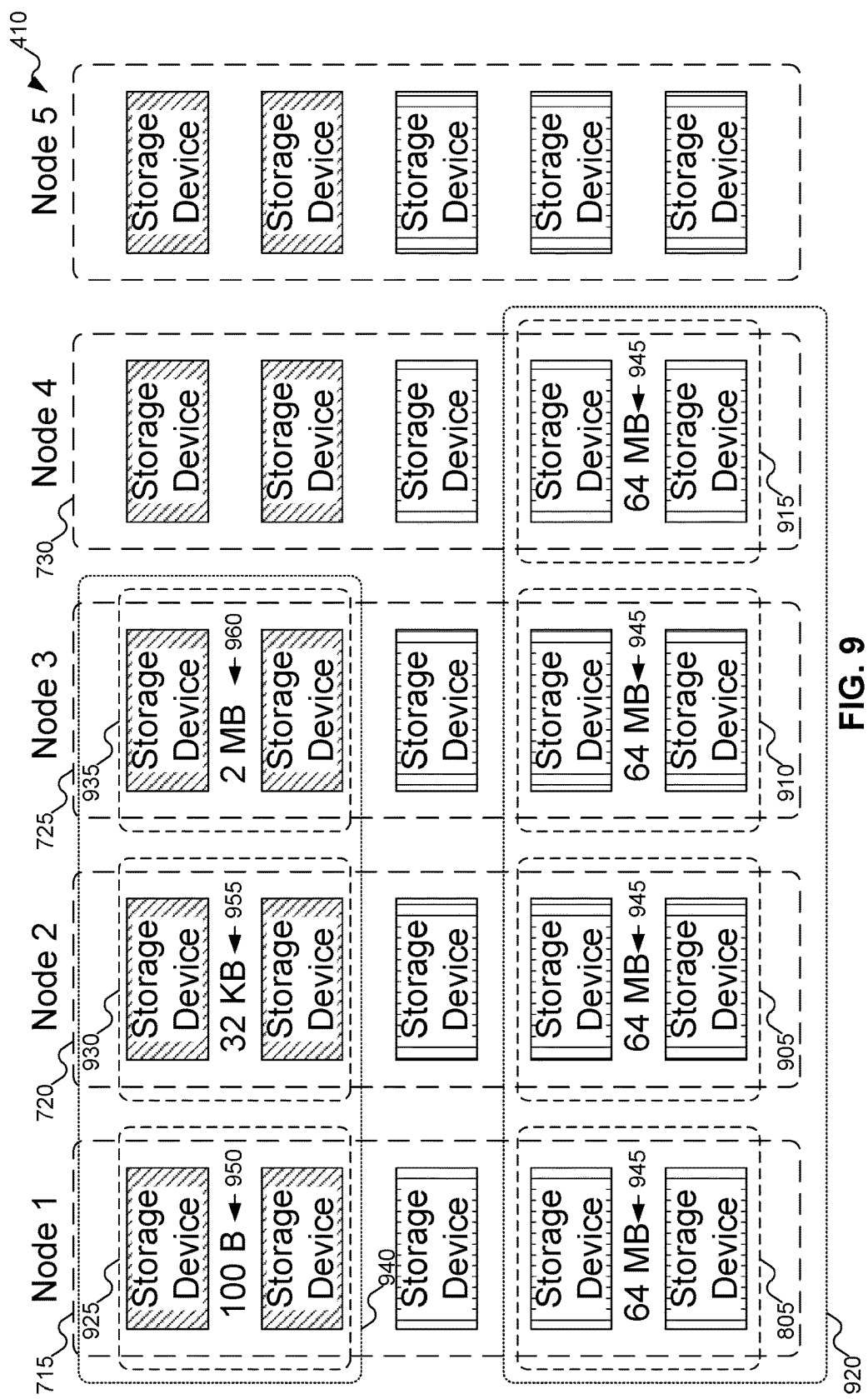
FIG. 9 shows various clusters and storage device page sizes being allocated to satisfy various applications' requirements in the storage device array of FIG. 7.

FIG. 9 shows various clusters and storage device page sizes being allocated to satisfy various applications' requirements in storage device array 410 of FIG. 7. In FIG. 9, tenant 145 of FIG. 2 may specify cluster size 430 of four virtual storage devices, each virtual storage device including parallelism 445 of two. Tenant 145 of FIG. 2 might be, for example, an HDFS. Similarly, tenant 230 of FIG. 2, which might be a KV-Store, may specify cluster size 430 of three virtual storage devices, each virtual storage device including parallelism 445 of two. To achieve these results, TASTE 225 of FIG. 2 may construct the appropriate virtual storage devices for each tenant. Because HDFS does not require high performance storage devices, TASTE 225 may construct the cluster for HDFS using low performance storage devices 710. Thus, TASTE 225 of FIG. 2 may construct virtual storage devices 805, 905, 910, and 915 (FTLs for these virtual storage devices are not shown in FIG. 9 for simplicity), which may be assembled into cluster 920. Similarly, because KV-Store benefits from high performance storage devices, TASTE 225 of FIG. 2 may construct virtual storage devices 925, 930, and 935 from high performance storage devices 705. Virtual storage devices 925, 930, and 935 may then be assembled into cluster 940.

FIG. 9 also illustrates the use of page size 435 of FIG. 4. In FIG. 9, tenant 145 of FIG. 2 may specify page size 435 of FIG. 4 as 64 MB (page size 945) for virtual storage devices 805, 905, 910, and 915, whereas KV-Store may specify page sizes 435 of FIG. 4 of 100 B, 32 KB, and 2 MB (page sizes 950, 955, and 960) for virtual storage devices 925, 930, and 935, respectively. Note that different tenants may specify different page sizes 435 of FIG. 4, nor does a single tenant have to use the same page size 435 of FIG. 4 for all storage devices (either virtual or physical).

Figure 10:
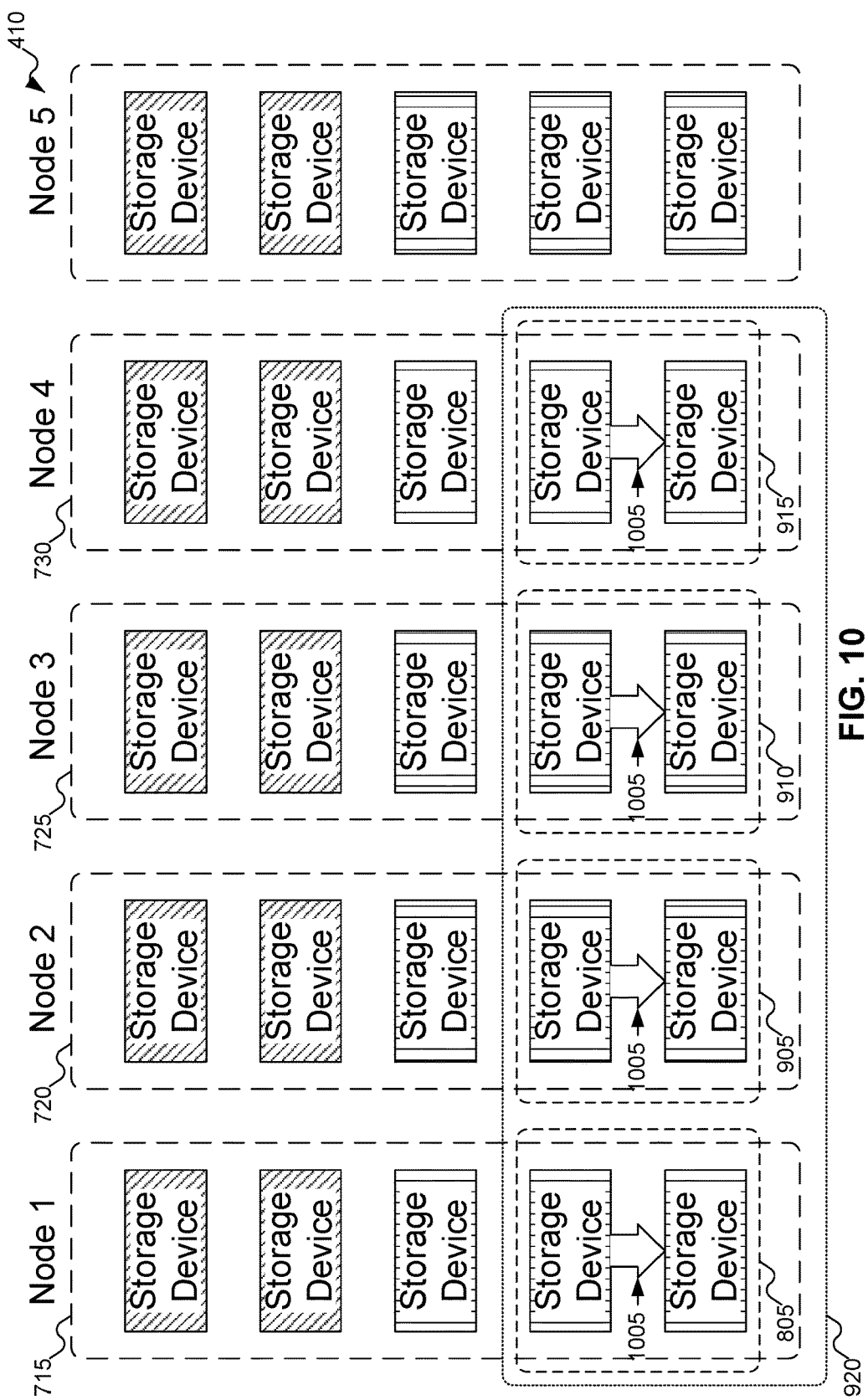
FIG. 10 shows replication between storage devices in the storage device array of FIG. 7.

FIG. 10 shows replication between storage devices in storage device array 410 of FIG. 7. In FIG. 10, similar to FIG. 9, tenant 145 of FIG. 2 may specify cluster size 430 of FIG. 4 of four storage devices. But instead of specifying parallelism 445 of FIG. 4, tenant 145 of FIG. 2 may specify redundancy 440 of two: that is, each datum should be saved on two storage devices within the node. TASTE 225 of FIG. 2 may then construct virtual storage devices 805, 905, 910, and 915; but instead of combining the individual storage devices to construct a virtual storage device that appears as large as both storage devices combined, TASTE 225 of FIG. 2 may manage the storage devices to copy data from one storage device to the other within each virtual storage device. This copy operation is shown as operation 1005.

Note that FIG. 10 shows copying of data between storage devices within a node. TASTE 225 of FIG. 2 may also manage copying of data between storage devices in different nodes (i.e., in different racks), to protect against a power loss that might otherwise take out a node. In that manner, data redundancy protects not only against the failure of a storage device but also against all storage devices within a node becoming unavailable simultaneously, as might occur with a power failure.

Figure 11:
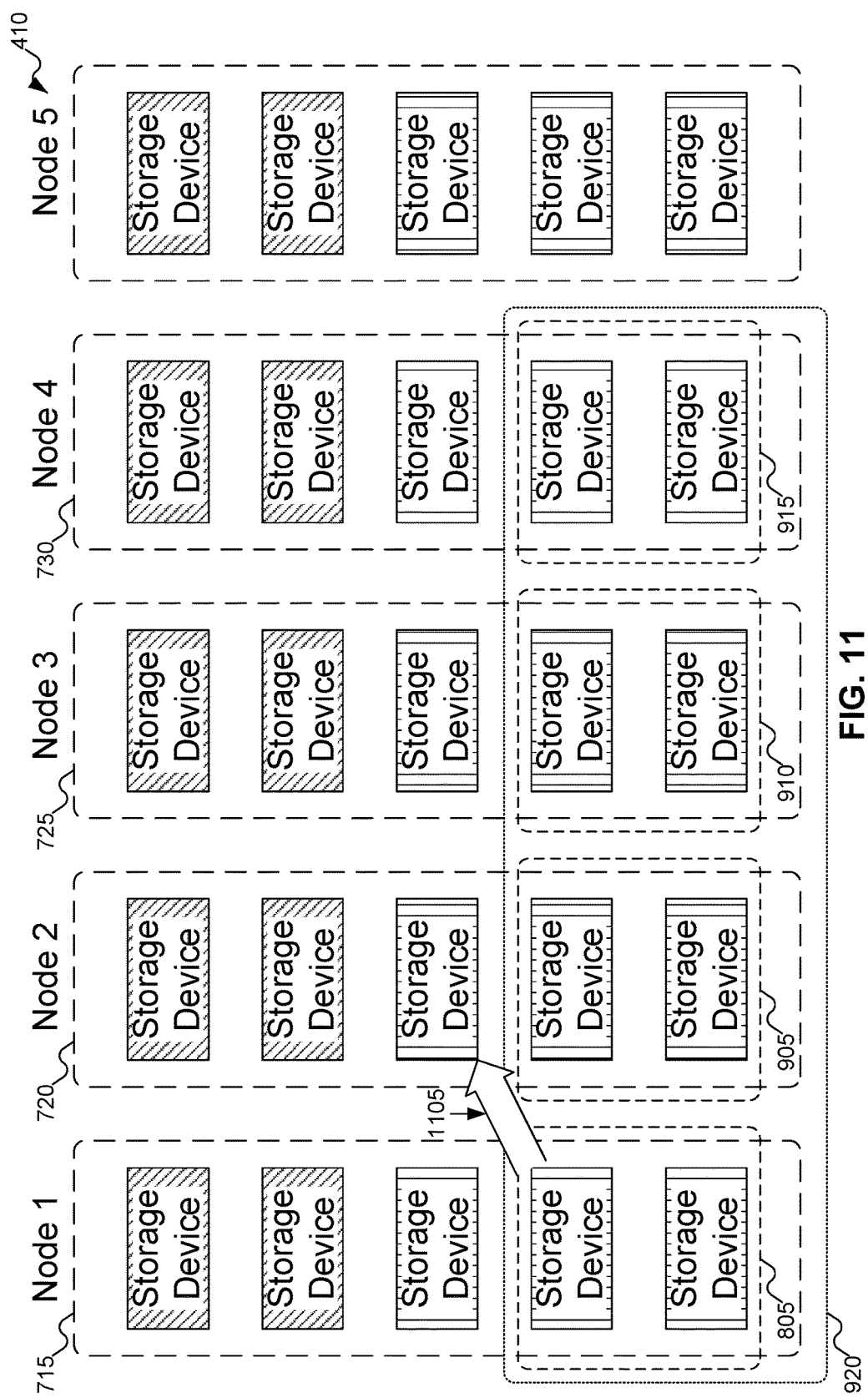
FIG. 11 shows migration of data between storage devices in the storage device array of FIG. 7.

FIG. 11 shows migration of data between storage devices in storage device array 410 of FIG. 7. In FIG. 11, either tenant 145 of FIG. 2 or TASTE 225 of FIG. 2 itself might decide that data should be migrated from one storage device to another. For example, tenant 145 of FIG. 2 might request an increase in storage beyond what the old storage device may support, and so TASTE 225 of FIG. 2 might migrate the data to the new storage device, as shown by operation 1105. Or, for reasons of wear leveling (or other reasons), TASTE 225 of FIG. 2 might determine the need to migrate the data from the old storage device to the new storage device, again as shown by operation 1105.

Figure 12:
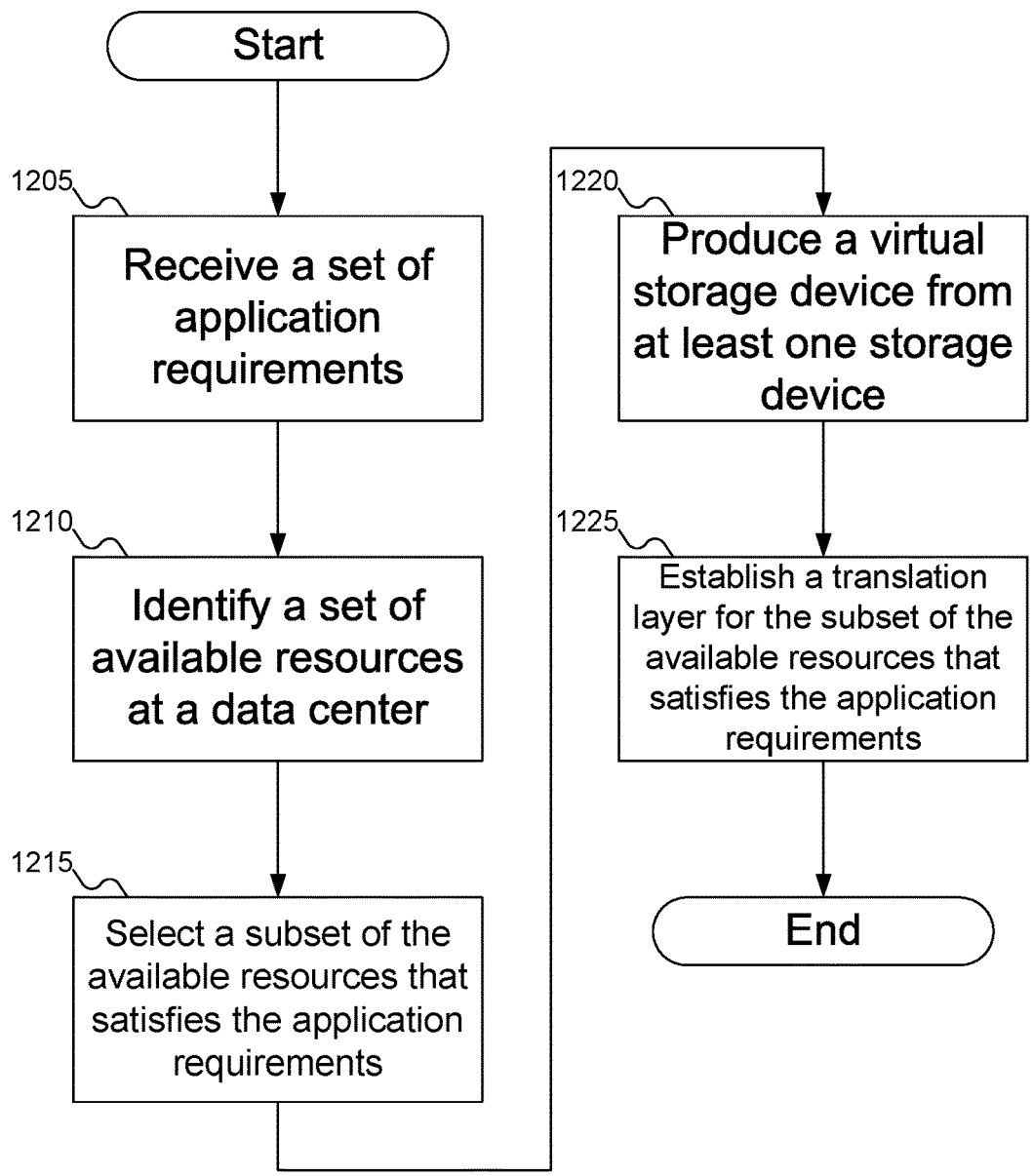
FIG. 12 shows a flowchart of an example procedure for the TASTE of FIG. 2 to receive an application's storage requirements and adjust the storage device array of FIG. 4 accordingly, according to an embodiment of the inventive concept.

FIG. 12 shows a flowchart of an example procedure for TASTE 225 of FIG. 2 to receive an application's storage requirements 415 of FIG. 4 and adjust storage device array 410 of FIG. 4 accordingly, according to an embodiment of the inventive concept. In FIG. 12, at block 1205, TASTE 225 of FIG. 2 may receive requirements 415 of FIG. 4 for a tenant (application). At block 1210, TASTE 225 of FIG. 2 may identify the available resources at data center 105 of FIG. 1: that is, the storage devices in storage device array 410 of FIG. 4, and all of their characteristics. This information may be accessed from storage 510. At block 1215, selection logic 515 of FIG. 5 may select a subset of the storage devices in storage device array 410 of FIG. 4 that may satisfy requirements 415 of FIG. 4 for the tenant. At block 1220, virtual storage device logic 520 of FIG. 5 may construct a virtual storage device, if needed, from at least one physical storage device. And at block 1225, virtual storage device logic 520 of FIG. 5 may establish a translation layer that satisfies the application's requirements. As described above with reference to FIG. 5, translation layer logic 525 of FIG. 5 may establish a translation layer that may satisfy one or more different objectives in the application requirements: block 1225 may implement a translation layer to achieve those objectives.

Figure 13A:
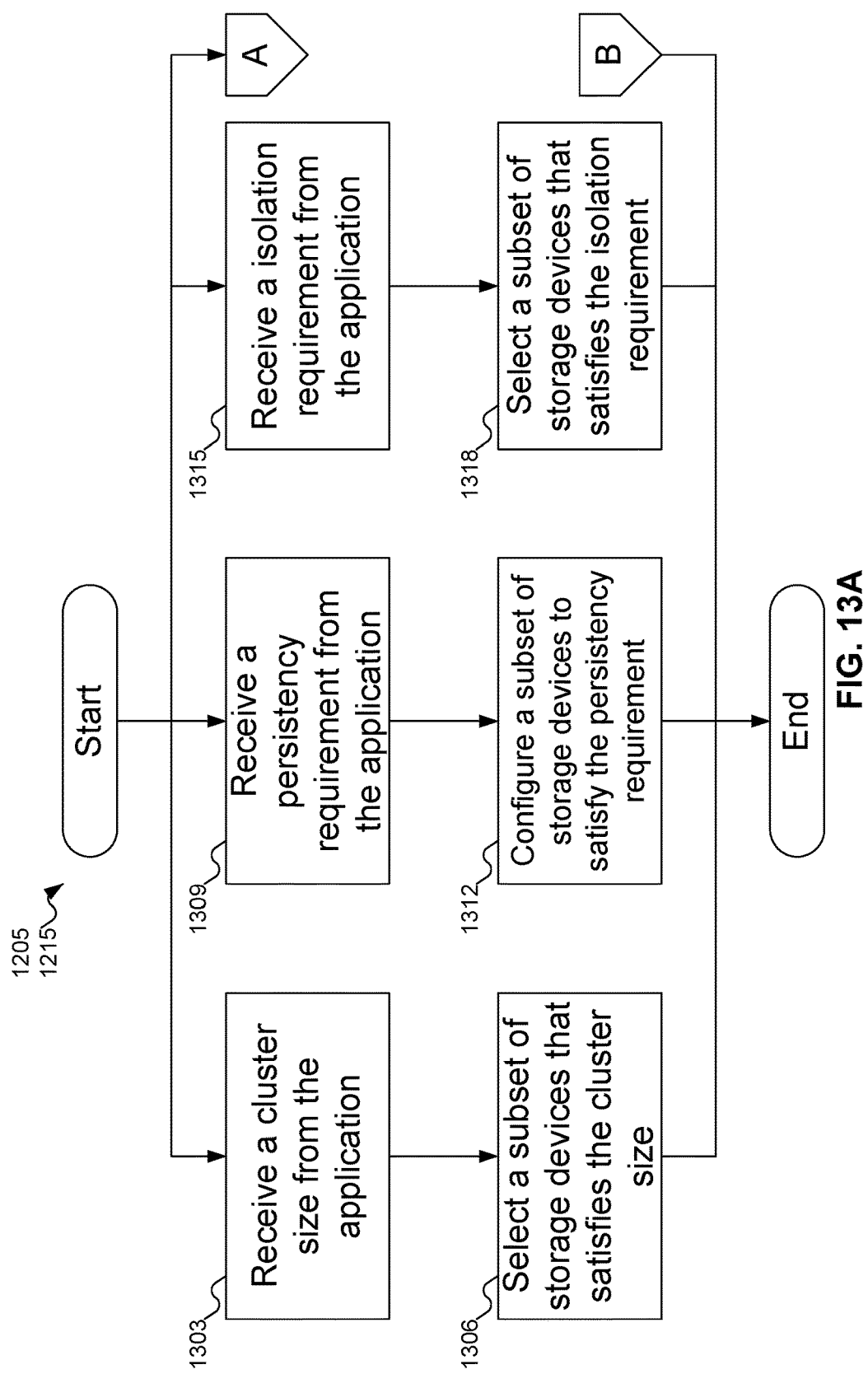
FIGS. 13A-13C show a flowchart of an example procedure for the TASTE of FIG. 2 to configure the storage device array of FIG. 4 responsive to the received application's requirements, according to an embodiment of the inventive concept.
Figure 13B:
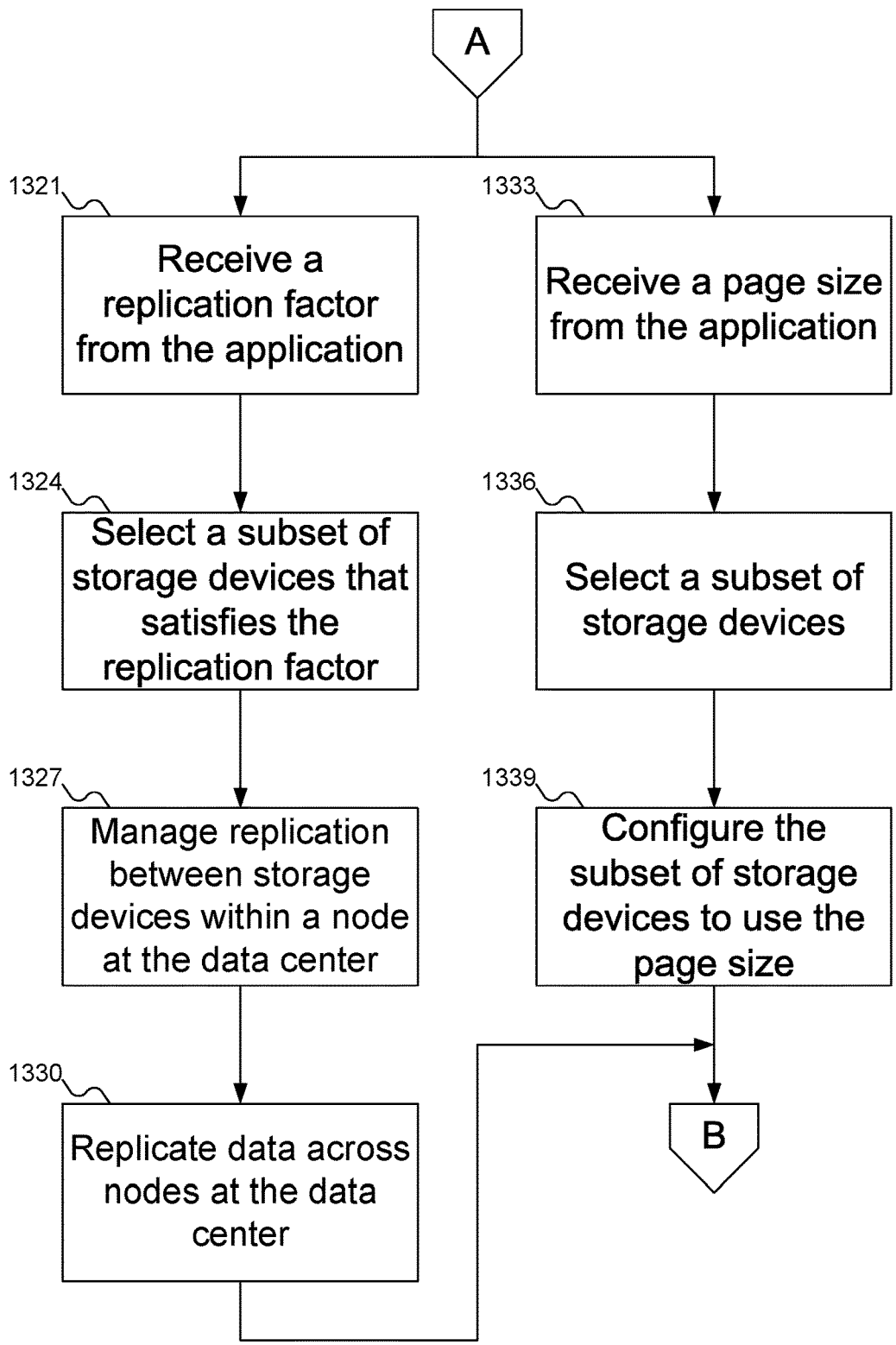
Figure 13C:
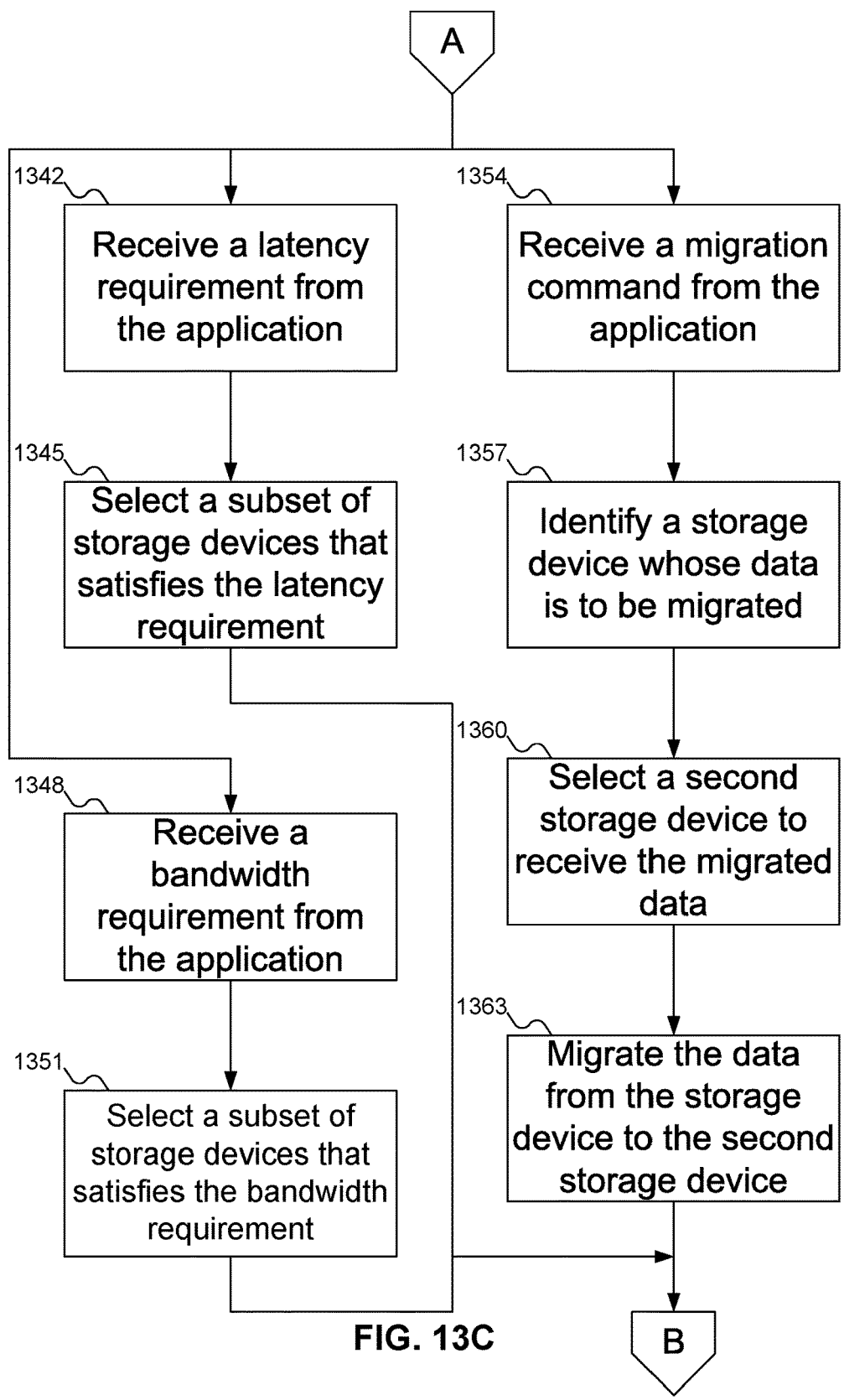

FIGS. 13A-13C show a flowchart of an example procedure for TASTE 225 of FIG. 2 to configure the storage device array 410 of FIG. 4 responsive to the received application's requirements, according to an embodiment of the inventive concept. In FIG. 13A, at block 1303, reception logic 505 of FIG. 5 may receive cluster size 430 of FIG. 4 from tenants 145 and 230 of FIG. 2. At block 1306, cluster selection logic 605 of FIG. 6 may select a subset of storage device array 410 of FIG. 4 that satisfies cluster size 430 of FIG. 4.

Alternatively, at block 1309, reception logic 505 of FIG. 5 may receive persistency requirement 450 of FIG. 4 from tenants 145 and 230 of FIG. 2. At block 1312, persistency logic 620 of FIG. 6 may configure storage devices in storage device array 410 of FIG. 4 to satisfy persistency requirement 450 of FIG. 4.

Alternatively, at block 1315, reception logic 505 of FIG. 5 may receive isolation requirement 455 of FIG. 4 from tenants 145 and 230 of FIG. 2. At block 1318, isolation logic 625 of FIG. 6 may select a subset of storage device array 410 of FIG. 4 that satisfies isolation requirement 455 of FIG. 4.

Alternatively, at block 1321 (FIG. 13B), reception logic 505 of FIG. 5 may receive replication factor 440 of FIG. 4 from tenants 145 and 230 of FIG. 2. At block 1324, cluster selection logic 605 of FIG. 6 may select a subset of storage device array 410 of FIG. 4 that satisfies replication factor 440 of FIG. 4. At block 1327, TASTE 225 of FIG. 2 may manage replication of data between storage devices within a node, and at block 1330, TASTE 225 of FIG. 2 may manage replication of data between nodes in data center 105 of FIG. 1.

Alternatively, at block 1333, reception logic 505 of FIG. 5 may receive page size(s) 435 of FIG. 4 from tenants 145 and 230 of FIG. 2. At block 1336, cluster selection logic 605 of FIG. 6 may select a subset of storage device array 410 of FIG. 4. At block 1339, configuration logic 610 of FIG. 6 may configure storage devices in storage device array 410 of FIG. 4 to use page size(s) 435 of FIG. 4.

Alternatively, at block 1342 (FIG. 13C), reception logic 505 of FIG. 5 may receive latency 425 of FIG. 4 from tenants 145 and 230 of FIG. 2. At block 1345, cluster selection logic 605 of FIG. 6 may select a subset of storage device array 410 of FIG. 4 that satisfies latency 425 of FIG. 4.

Alternatively, at block 1348, reception logic 505 of FIG. 5 may receive bandwidth 420 of FIG. 4 from tenants 145 and 230 of FIG. 2. At block 1351, cluster selection logic 605 of FIG. 6 may select a subset of storage device array 410 of FIG. 4 that satisfies bandwidth 420 of FIG. 4.

Alternatively, at block 1354, reception logic 505 of FIG. 5 may receive migration 460 of FIG. 4 from tenants 145 and 230 of FIG. 2 (or from TASTE 225 of FIG. 2 itself). At block 1357, TASTE 225 of FIG. 2 may identify a storage device whose data is to be migrated. At block 1360, TASTE 225 of FIG. 2 may select a second storage device to which the data should be migrated. And at block 1363, migration logic 630 of FIG. 6 may migrate the data from the first storage device to the second storage device.

In FIGS. 12-13C, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Tenant-Aware Storage-Sharing Engine (TASTE) (225), comprising:

storage (510) for information about a set of available storage devices (705, 710);

reception logic (505) to receive storage device requirements (415) from an application (145, 230); and selection logic (515) to select a subset of the set of available storage devices (705, 710) that satisfy the storage device requirements (415).

Statement 2. An embodiment of the inventive concept includes a TASTE (225) according to statement 1, wherein:

the storage device requirements (415) includes a cluster size (430) for the application (145, 230); and the selection logic (515) includes a cluster selection logic (605) to select the subset of the set of available storage devices (705, 710), a number of storage devices (705, 710) in the subset of available storage devices (705, 710) equal to the cluster size (430).

Statement 3. An embodiment of the inventive concept includes a TASTE (225) according to statement 2, further comprising a translation layer logic (525) to establish a translation layer (810) for the subset of the set of available storage devices (705, 710) to map logical block addresses to physical block addresses on the subset of the set of available storage devices (705, 710).

Statement 4. An embodiment of the inventive concept includes a TASTE (225) according to statement 3, further comprising a translation layer logic (525) to establish a translation layer (810) for a virtual storage device (805, 905, 910, 915, 925, 930, 935) from a plurality of storage devices (705, 710) in the subset of the set of available storage devices (705, 710).

Statement 5. An embodiment of the inventive concept includes a TASTE (225) according to statement 1, wherein:

the storage device requirements (415) includes a page size (435, 950, 955, 960) for the application (145, 230); and the selection logic (515) includes configuration logic (610) to configure the subset of the set of available storage devices (705, 710) to use the page size (435, 950, 955, 960).

Statement 6. An embodiment of the inventive concept includes a TASTE (225) according to statement 5, further comprising a translation layer logic (525) to establish a translation layer (810) for the subset of the set of available storage devices (705, 710) to map logical block addresses to physical block addresses according to the page size (435, 950, 955, 960).

Statement 7. An embodiment of the inventive concept includes a TASTE (225) according to statement 5, wherein:

the storage device requirements (415) includes a plurality of page sizes (435, 950, 955, 960) for the application (145, 230); and the selection logic (515) includes configuration logic (610) to configure the subset of the set of available storage devices (705, 710) to use the plurality of page sizes (435, 950, 955, 960).

Statement 8. An embodiment of the inventive concept includes a TASTE (225) according to statement 7, further comprising a translation layer logic (525) to establish a translation layer (810) for the subset of the set of available storage devices (705, 710) to map a first logical block address to a first physical block address on a first of the subset of the set of available storage device (705, 710) according to a first page size (435, 950, 955, 960) and a second logical block address to a second physical block address on a second of the subset of the set of available storage device (705, 710) according to a second page size (435, 950, 955, 960).

Statement 9. An embodiment of the inventive concept includes a TASTE (225) according to statement 1, wherein:

the storage device requirements (415) includes a replication factor (440) for the application (145, 230); and the selection logic (515) includes replication logic (615) to replicate data across a number of the subset of the set of available storage devices (705, 710), the number equal to the replication factor (440).

Statement 10. An embodiment of the inventive concept includes a TASTE (225) according to statement 9, further comprising a translation layer logic (525) to establish a translation layer (810) for the subset of the set of available storage devices (705, 710) to manage a first storage device (705, 710) in the subset of the set of available storage devices (705, 710) as a replica of a second storage device (705, 710) in the subset of the set of available storage devices (705, 710).

Statement 11. An embodiment of the inventive concept includes a TASTE (225) according to statement 9, wherein the replication logic (615) is operative to replicate data across storage devices (705, 710) within a node (715, 720, 725, 730, 735).

Statement 12. An embodiment of the inventive concept includes a TASTE (225) according to statement 11, wherein the application (145, 230) is operative to replicate data across nodes (715, 720, 725, 730, 735).

Statement 13. An embodiment of the inventive concept includes a TASTE (225) according to statement 1, wherein:

the storage device requirements (415) includes a persistency requirement (450) for the application (145, 230); and the selection logic (515) includes persistency logic (620) to ensure that data from the application (145, 230) persists for a threshold amount of time within the subset of the set of available storage devices (705, 710).

Statement 14. An embodiment of the inventive concept includes a TASTE (225) according to statement 13, further comprising a translation layer logic (525) to establish a translation layer (810) for the subset of the set of available storage devices (705, 710) such that data on the subset of the set of available storage devices (705, 710) should not be invalidate for at least the threshold amount of time.

Statement 15. An embodiment of the inventive concept includes a TASTE (225) according to statement 1, wherein:

the storage device requirements (415) includes a persistency requirement (450) for the application (145, 230); and the selection logic (515) includes persistency logic (620) to ensure that the subset of the set of available storage devices (705, 710) may protect data against a power failure.

Statement 16. An embodiment of the inventive concept includes a TASTE (225) according to statement 1, wherein:

the storage device requirements (415) includes an isolation requirement (455) for the application (145, 230); and the selection logic (515) includes isolation logic (625) to ensure that the subset of the set of available storage devices (705, 710) does not overlap a second subset of the set of available storage devices (705, 710), the second subset of the set of available storage devices (705, 710) used by a second application (145, 230).

Statement 17. An embodiment of the inventive concept includes a TASTE (225) according to statement 1, wherein:

the storage device requirements (415) includes a migration command (460) for the application (145, 230); and the selection logic (515) includes migration logic (630) to migrate data from a first storage device within the subset of the set of available storage devices (705, 710) to a second storage device within the subset of the available storage devices (705, 710).

Statement 18. An embodiment of the inventive concept includes a TASTE (225) according to statement 1, further comprising virtual storage device logic (520) to produce a virtual storage device (805, 905, 910, 915, 925, 930, 935)

from a plurality of storage devices (705, 710) in the subset of the set of available storage devices (705, 710).

Statement 19. An embodiment of the inventive concept includes a TASTE (225) according to statement 18, further comprising a translation layer logic (525) to establish a translation layer (810) for the virtual storage device (805, 905, 910, 915, 925, 930, 935).

Statement 20. An embodiment of the inventive concept includes a TASTE (225) according to statement 1, wherein:

the storage device requirements (415) includes a bandwidth requirement (420) for the application (145, 230); and the selection logic (515) is operative to select the subset of the set of available storage devices (705, 710) that, in combination, provide an overall bandwidth no less than the bandwidth requirement (420).

Statement 21. An embodiment of the inventive concept includes a TASTE (225) according to statement 1, wherein:

the storage device requirements (415) includes a latency requirement (425) for the application (145, 230); and the selection logic (515) is operative to select the subset of the set of available storage devices (705, 710) that, in combination, provide an average latency no greater than the latency requirement (425).

Statement 22. An embodiment of the inventive concept includes a method, comprising:

receiving (1205) a set of storage device requirements (415) from an application (145, 230) at a Tenant-Aware Storage-Sharing Engine (TASTE) (225);

identifying (1210) a set of available storage devices (705, 710); and selecting (1215) a subset of the set of available storage devices (705, 710) to satisfy the set of storage device requirements (415) from the application (145, 230).

Statement 23. An embodiment of the inventive concept includes a method according to statement 22, wherein:

receiving (1205) a set of storage device requirements (415) from an application (145, 230) at a Tenant-Aware Storage-Sharing Engine (TASTE) (225) includes receiving (1303) a cluster size (430) for the application (145, 230); and selecting (1215) a subset of the set of available storage devices (705, 710) to satisfy the set of storage device requirements (415) from the application (145, 230) includes selecting (1306) storage devices (705, 710) from the set of available storage devices (705, 710), a number of storage devices (705, 710) in the subset of available storage devices (705, 710) equal to the cluster size (430) for the application (145, 230).

Statement 24. An embodiment of the inventive concept includes a method according to statement 23, further comprising establishing (1225) a translation layer (810) for the subset of the set of available storage devices (705, 710) to map logical block addresses to physical block addresses on the subset of the set of available storage devices (705, 710).

Statement 25. An embodiment of the inventive concept includes a method according to statement 22, wherein:

receiving (1205) a set of storage device requirements (415) from an application (145, 230) at a Tenant-Aware Storage-Sharing Engine (TASTE) (225) includes receiving (1333) a page size (435, 950, 955, 960) for the application (145, 230); and selecting (1215) a subset of the set of available storage devices (705, 710) to satisfy the set of storage device requirements (415) from the application (145, 230) includes:

selecting (1336) storage devices (705, 710) from the set of available storage devices (705, 710); and configuring (1339) the selected storage devices (705, 710) to use the page size (435, 950, 955, 960) for the application (145, 230).

Statement 26. An embodiment of the inventive concept includes a method according to statement 25, further comprising establishing (1225) a translation layer (810) for the subset of the set of available storage devices (705, 710) to map logical block addresses to physical block addresses according to the page size (435, 950, 955, 960).

Statement 27. An embodiment of the inventive concept includes a method according to statement 25, wherein:

receiving (1333) a page size (435, 950, 955, 960) for the application (145, 230) includes receiving (1333) a plurality of page sizes (435, 950, 955, 960) for the application (145, 230); and configuring (1339) the selected storage devices (705, 710) to use the page size (435, 950, 955, 960) for the application (145, 230) includes configuring (1339) the selected storage devices (705, 710) to use the plurality of page sizes (435, 950, 955, 960) for the application (145, 230);

Statement 28. An embodiment of the inventive concept includes a method according to statement 27, further comprising establishing (1225) a translation layer (810) for the subset of the set of available storage devices (705, 710) to map logical block addresses to physical block addresses according to the plurality of page sizes (435, 950, 955, 960).

Statement 29. An embodiment of the inventive concept includes a method according to statement 22, wherein:

receiving (1205) a set of storage device requirements (415) from an application (145, 230) at a Tenant-Aware Storage-Sharing Engine (TASTE) (225) includes receiving (1321) a replication factor (440) for the application (145, 230); and selecting (1215) a subset of the set of available storage devices (705, 710) to satisfy the set of storage device requirements (415) from the application (145, 230) includes selecting (1324) storage devices (705, 710) from the set of available storage devices (705, 710) such that each data may be stored on a number of storage devices (705, 710), the number of storage devices (705, 710) at least as large as the replication factor (440) for the application (145, 230).

Statement 30. An embodiment of the inventive concept includes a method according to statement 29, further comprising establishing (1225) a translation layer (810) for the subset of the set of available storage devices (705, 710) to manage a first storage device (705, 710) in the subset of the set of available storage devices (705, 710) as a replica of a second storage device (705, 710) in the subset of the set of available storage devices (705, 710).

Statement 31. An embodiment of the inventive concept includes a method according to statement 29, further comprising managing (1327) replication between storage devices (705, 710) in the subset of the set of available storage devices (705, 710) in a node (715, 720, 725, 730, 735).

Statement 32. An embodiment of the inventive concept includes a method according to statement 31, further comprising replicating (615) data across nodes (715, 720, 725, 730, 735) by the application (145, 230).

Statement 33. An embodiment of the inventive concept includes a method according to statement 22, wherein:

receiving (1205) a set of storage device requirements (415) from an application (145, 230) at a Tenant-Aware Storage-Sharing Engine (TASTE) (225) includes receiving (1309) a persistency requirement for the application (145, 230); and selecting (1215) a subset of the set of available storage devices (705, 710) to satisfy the set of storage device requirements (415) from the application (145, 230) includes configuring (1312) storage devices (705, 710) from the set of available storage devices (705, 710) such that data will be stored on the storage devices (705, 710) for a threshold amount of time according to the persistency requirement for the application (145, 230).

Statement 34. An embodiment of the inventive concept includes a method according to statement 33, further comprising establishing (1225) a translation layer (810) for the subset of the set of available storage devices (705, 710) such that data on the subset of the set of available storage devices (705, 710) should not be invalidate for at least the threshold amount of time.

Statement 35. An embodiment of the inventive concept includes a method according to statement 22, wherein:
receiving (1205) a set of storage device requirements (415) from an application (145, 230) at a Tenant-Aware Storage-Sharing Engine (TASTE) (225) includes receiving (1309) a persistency requirement for the application (145, 230); and
selecting (1215) a subset of the set of available storage devices (705, 710) to satisfy the set of storage device requirements (415) from the application (145, 230) includes selecting storage devices (705, 710) from the set of available storage devices (705, 710) such that data will be protected against a power failure.

Statement 36. An embodiment of the inventive concept includes a method according to statement 22, wherein:
receiving (1205) a set of storage device requirements (415) from an application (145, 230) at a Tenant-Aware Storage-Sharing Engine (TASTE) (225) includes receiving (1315) an isolation requirement (455) specifying that the application (145, 230) be isolated from a second application (145, 230); and
selecting (1215) a subset of the set of available storage devices (705, 710) to satisfy the set of storage device requirements (415) from the application (145, 230) includes selecting (1318) storage devices (705, 710) from the set of available storage devices (705, 710) such that no storage device (705, 710) in the subset of the set of available storage devices (705, 710) stores data for the second application (145, 230).

Statement 37. An embodiment of the inventive concept includes a method according to statement 22, wherein:
receiving (1205) a set of storage device requirements (415) from an application (145, 230) at a Tenant-Aware Storage-Sharing Engine (TASTE) (225) includes receiving (1354) a migration command (460) for the application (145, 230); and
selecting (1215) a subset of the set of available storage devices (705, 710) to satisfy the set of storage device requirements (415) from the application (145, 230) includes:
 identifying (1357) a storage device whose data is to be migrated;
 selecting (1360) a second storage device from the set of available storage devices (705, 710); and
 migrating (1363) data from the storage device to the second storage device.

Statement 38. An embodiment of the inventive concept includes a method according to statement 22, wherein selecting (1215) a subset of the set of available storage devices (705, 710) to satisfy the set of storage device requirements (415) from the application (145, 230) includes producing (1220) a virtual storage device from at least one storage device.

Statement 39. An embodiment of the inventive concept includes a method according to statement 38, further comprising establishing (1225) a translation layer (810) for the virtual storage device (805, 905, 910, 915, 925, 930, 935).

Statement 40. An embodiment of the inventive concept includes a method according to statement 22, wherein:
receiving (1205) a set of storage device requirements (415) from an application (145, 230) at a Tenant-Aware Storage-Sharing Engine (TASTE) (225) includes receiving (1348) a bandwidth requirement (420) for the application (145, 230); and
selecting (1215) a subset of the set of available storage devices (705, 710) to satisfy the set of storage device requirements (415) from the application (145, 230) includes selecting (1351) storage devices (705, 710) from the set of available storage devices (705, 710) that, in combination, provide an overall bandwidth no less than the bandwidth requirement (420) for the application (145, 230).

Statement 41. An embodiment of the inventive concept includes a method according to statement 22, wherein:
receiving (1205) a set of storage device requirements (415) from an application (145, 230) at a Tenant-Aware Storage-Sharing Engine (TASTE) (225) includes receiving (1342) a latency requirement (425) for the application (145, 230); and
selecting (1215) a subset of the set of available storage devices (705, 710) to satisfy the set of storage device requirements (415) from the application (145, 230) includes selecting (1345) storage devices (705, 710) from the set of available storage devices (705, 710) that, in combination, provide an average latency no greater than the latency requirement (425) for the application (145, 230).

Statement 42. An embodiment of the inventive concept includes an article, comprising a tangible storage medium, the tangible storage medium having stored thereon non-transitory instructions that, when executed by a machine (110), result in:
receiving (1205) a set of storage device requirements (415) from an application (145, 230) at a Tenant-Aware Storage-Sharing Engine (TASTE) (225);
identifying (1210) a set of available storage devices (705, 710); and
selecting (1215) a subset of the set of available storage devices (705, 710) to satisfy the set of storage device requirements (415) from the application (145, 230).

Statement 43. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1303) a cluster size (430) for the application (145, 230); and
selecting (1215) a subset of the set of available storage devices (705, 710) to satisfy the set of storage device requirements (415) from the application (145, 230) includes selecting (1306) storage devices (705, 710) from the set of available storage devices (705, 710), a number of storage devices (705, 710) in the subset of available storage devices (705, 710) equal to the cluster size (430) for the application (145, 230).

Statement 44. An embodiment of the inventive concept includes an article according to statement 43, further comprising establishing (1225) a translation layer (810) for the subset of the set of available storage devices (705, 710) to map logical block addresses to physical block addresses on the subset of the set of available storage devices (705, 710).

Statement 45. An embodiment of the inventive concept includes an article according to statement 42, wherein:

receiving (1205) a set of storage device requirements (415) from an application (145, 230) at a Tenant-Aware Storage-Sharing Engine (TASTE) (225) includes receiving (1333) a page size (435, 950, 955, 960) for the application (145, 230); and selecting (1215) a subset of the set of available storage devices (705, 710) to satisfy the set of storage device requirements (415) from the application (145, 230) includes:
selecting (1336) storage devices (705, 710) from the set of available storage devices (705, 710); and
configuring (1339) the selected storage devices (705, 710) to use the page size (435, 950, 955, 960) for the application (145, 230).

Statement 46. An embodiment of the inventive concept includes an article according to statement 45, further comprising establishing (1225) a translation layer (810) for the subset of the set of available storage devices (705, 710) to map logical block addresses to physical block addresses according to the page size (435, 950, 955, 960).

Statement 47. An embodiment of the inventive concept includes an article according to statement 45, wherein:
receiving (1333) a page size (435, 950, 955, 960) for the application (145, 230) includes receiving (1333) a plurality of page sizes (435, 950, 955, 960) for the application (145, 230); and
configuring (1339) the selected storage devices (705, 710) to use the page size (435, 950, 955, 960) for the application (145, 230) includes configuring (1339) the selected storage devices (705, 710) to use the plurality of page sizes (435, 950, 955, 960) for the application (145, 230);

Statement 48. An embodiment of the inventive concept includes an article according to statement 47, further comprising establishing (1225) a translation layer (810) for the subset of the set of available storage devices (705, 710) to map logical block addresses to physical block addresses according to the plurality of page sizes (435, 950, 955, 960).

Statement 49. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1321) a replication factor (440) for the application (145, 230); and
selecting (1215) a subset of the set of available storage devices (705, 710) to satisfy the set of storage device requirements (415) from the application (145, 230) includes selecting (1324) storage devices (705, 710) from the set of available storage devices (705, 710) each data may be stored on a number of storage devices (705, 710), the number of storage devices (705, 710) at least as large as the replication factor (440) for the application (145, 230).

Statement 50. An embodiment of the inventive concept includes an article according to statement 49, further comprising establishing (1225) a translation layer (810) for the subset of the set of available storage devices (705, 710) to manage a first storage device (705, 710) in the subset of the set of available storage devices (705, 710) as a replica of a second storage device (705, 710) in the subset of the set of available storage devices (705, 710).

Statement 51. An embodiment of the inventive concept includes an article according to statement 49, the tangible storage medium having stored thereon further non-transitory instructions that, when executed by the machine (110), result in managing (1327) replication between storage devices (705, 710) in the subset of the set of available storage devices (705, 710) in a node (715, 720, 725, 730, 735).

Statement 52. An embodiment of the inventive concept includes an article according to statement 51, the tangible storage medium having stored thereon further non-transitory instructions that, when executed by the machine (110), result in replicating (615) data across nodes (715, 720, 725, 730, 735) by the application (145, 230).

Statement 53. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1309) a persistency requirement for the application (145, 230); and
selecting (1215) a subset of the set of available storage devices (705, 710) to satisfy the set of storage device requirements (415) from the application (145, 230) includes configuring (1312) storage devices (705, 710) from the set of available storage devices (705, 710) such that data will be stored on the storage devices (705, 710) for a threshold amount of time according to the persistency requirement for the application (145, 230).

Statement 54. An embodiment of the inventive concept includes a method according to statement 53, further comprising establishing (1225) a translation layer (810) for the subset of the set of available storage devices (705, 710) such that data on the subset of the set of available storage devices (705, 710) should not be invalidate for at least the threshold amount of time.

Statement 55. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1309) a persistency requirement for the application (145, 230); and
selecting (1215) a subset of the set of available storage devices (705, 710) to satisfy the set of storage device requirements (415) from the application (145, 230) includes selecting storage devices (705, 710) from the set of available storage devices (705, 710) such that data will be protected against a power failure.

Statement 56. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1315) an isolation requirement (455) specifying that the application (145, 230) be isolated from a second application (145, 230); and
selecting (1215) a subset of the set of available storage devices (705, 710) to satisfy the set of storage device requirements (415) from the application (145, 230) includes selecting (1318) storage devices (705, 710) from the set of available storage devices (705, 710) such that no storage device (705, 710) in the subset of the set of available storage devices (705, 710) stores data for the second application (145, 230).

Statement 57. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1354) a migration command (460) for the application (145, 230); and
selecting (1215) a subset of the set of available storage devices (705, 710) to satisfy the set of storage device requirements (415) from the application (145, 230) includes:

identifying (1357) a storage device whose data is to be migrated;
selecting (1360) a second storage device from the set of available storage devices (705, 710); and
migrating (1363) data from the storage device to the second storage device.

Statement 58. An embodiment of the inventive concept includes an article according to statement 42, wherein selecting (1215) a subset of the set of available storage devices (705, 710) to satisfy the set of storage device requirements (415) from the application (145, 230) includes producing (1220) a virtual storage device from at least one storage device.

Statement 59. An embodiment of the inventive concept includes an article according to statement 58, the tangible storage medium having stored thereon further non-transitory instructions that, when executed by the machine (110), result in establishing (1225) a translation layer (810) for the virtual storage device (805, 905, 910, 915, 925, 930, 935).

Statement 60. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1348) a bandwidth requirement (420) for the application (145, 230); and
selecting (1215) a subset of the set of available storage devices (705, 710) to satisfy the set of storage device requirements (415) from the application (145, 230) includes selecting (1351) storage devices (705, 710) from the set of available storage devices (705, 710) that, in combination, provide an overall bandwidth no less than the bandwidth requirement (420) for the application (145, 230).

Statement 61. An embodiment of the inventive concept includes an article according to statement 42, wherein:
receiving (1205) a set of storage device requirements (415) from an application (145, 230) at a Tenant-Aware Storage-Sharing Engine (TASTE) (225) includes receiving (1342) a latency requirement (425) for the application (145, 230); and
selecting (1215) a subset of the set of available storage devices (705, 710) to satisfy the set of storage device requirements (415) from the application (145, 230) includes selecting (1345) storage devices (705, 710) from the set of available storage devices (705, 710) that, in combination, provide an average latency no greater than the latency requirement (425) for the application (145, 230).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Tenant-Aware Storage-Sharing Engine (TASTE), comprising:
storage for information about a set of available storage devices;
reception logic to receive storage device requirements from an application, the storage device requirements drawn from a set including a desired capacity, a desired bandwidth, a desired latency, a desired cluster size, a desired page size, a desired redundancy, a desired parallelism, a desired persistency, and a desired security;
selection logic to select a subset of the set of available storage devices that satisfy the storage device requirements using the information about the set of available storage devices; and
logic to allocate storage for the application using the selected subset of the set of available storage devices that satisfy the storage device requirements,
wherein:
the set of available storage devices includes at least two physical storage devices;
the desired capacity includes a capacity required by the application;
the desired bandwidth includes a minimum bandwidth required by the application;
the desired latency includes a maximum latency tolerated by the application;
the desired cluster size includes a cluster number of the storage devices to be assigned to the application;
the desired page size includes a size for each page in the storage devices assigned to the application;
the desired redundancy includes a redundancy number indicating how many copies of each datum stored by the application should be stored in the set of available storage devices;
the desired parallelism includes a parallelism number indicating how many storage devices may be combined into a virtual storage device assigned to the application;
the desired persistency includes a minimum amount of time that data for the application may be stored on the storage devices assigned to the application before being erased; and
the desired security includes an identifier of a second application such that data for the application is not stored on a common storage device with second data for the second application.

2. A TASTE according to claim 1, wherein:
the storage device requirements include the desired cluster size for the application; and
the selection logic includes a cluster selection logic to select the subset of the set of available storage devices, a number of storage devices in the subset of available storage devices equal to the desired cluster size,
wherein the desired cluster size is at least two.

3. A TASTE according to claim 2, further comprising a translation layer logic to establish a translation layer for the subset of the set of available storage devices to map logical block addresses to physical block addresses on the subset of the set of available storage devices.

4. A TASTE according to claim 1, wherein:
the storage device requirements include the desired page size for the application; and
the selection logic includes configuration logic to configure the subset of the set of available storage devices to use the desired page size.

5. A TASTE according to claim 4, further comprising a translation layer logic to establish a translation layer for the subset of the set of available storage devices to map logical block addresses to physical block addresses according to the desired page size.

6. A TASTE according to claim 1, wherein:
the storage device requirements include the desired redundancy for the application; and
the selection logic includes replication logic to replicate data across a number of the subset of the set of available storage devices, the number equal to the desired redundancy.

7. A TASTE according to claim 6, further comprising a translation layer logic to establish a translation layer for the subset of the set of available storage devices to manage a first storage device in the subset of the set of available storage devices as a replica of a second storage device in the subset of the set of available storage devices.

8. A TASTE according to claim 1, wherein:
the storage device requirements include the desired persistency for the application; and
the selection logic includes persistency logic to ensure that data from the application persists for the minimum amount of time within the subset of the set of available storage devices.

9. A TASTE according to claim 8, further comprising a translation layer logic to establish a translation layer for the subset of the set of available storage devices such that data on the subset of the set of available storage devices should not be invalidate for at least the minimum amount of time.

10. A TASTE according to claim 1, wherein:
the storage device requirements include a second desired persistency for the application; and
the selection logic includes persistency logic to ensure that the subset of the set of available storage devices may protect data against a power failure.

11. A TASTE according to claim 1, wherein:
the storage device requirements include the desired security for the application; and
the selection logic includes isolation logic to ensure that the subset of the set of available storage devices does not overlap a second subset of the set of available storage devices, the second subset of the set of available storage devices used by the second application.

12. A TASTE according to claim 1, wherein:
the storage device requirements include a migration command for the application; and
the selection logic includes migration logic to migrate data from a first storage device within the subset of the set of available storage devices to a second storage device within the subset of the available storage devices.

13. A TASTE according to claim 1, further comprising virtual storage device logic to produce a virtual storage device from a plurality of storage devices in the subset of the set of available storage devices.

14. A TASTE according to claim 13, further comprising a translation layer logic to establish a translation layer for the virtual storage device.

15. A method, comprising:
receiving a set of storage device requirements from an application at a Tenant-Aware Storage-Sharing Engine (TASTE), the storage device requirements drawn from a set including a desired capacity, a desired bandwidth, a desired latency, a desired cluster size, a desired page size, a desired redundancy, a desired parallelism, a desired persistency, and a desired security;
identifying a set of available storage devices;
selecting a subset of the set of available storage devices to satisfy the set of storage device requirements from the application using information about the set of available storage devices; and
allocating storage for the application using the selected subset of the set of available storage devices that satisfy the storage device requirements,
wherein:
the set of available storage devices includes at least two physical storage devices;

the desired capacity includes a capacity required by the application;
the desired bandwidth includes a minimum bandwidth required by the application;
the desired latency includes a maximum latency tolerated by the application;
the desired cluster size includes a cluster number of the storage devices to be assigned to the application;
the desired page size includes a size for each page in the storage devices assigned to the application;
the desired redundancy includes a redundancy number indicating how many copies of each datum stored by the application should be stored in the set of available storage devices;
the desired parallelism includes a parallelism number indicating how many storage devices may be combined into a virtual storage device assigned to the application;
the desired persistency includes a minimum amount of time that data for the application may be stored on the storage devices assigned to the application before being erased; and
the desired security includes an identifier of a second application such that data for the application is not stored on a common storage device with second data for the second application.

16. A method according to claim 15, wherein:
receiving a set of storage device requirements from an application at a Tenant-Aware Storage-Sharing Engine (TASTE) includes receiving the desired cluster size for the application; and
selecting a subset of the set of available storage devices to satisfy the set of storage device requirements from the application includes selecting storage devices from the set of available storage devices, a number of storage devices in the subset of available storage devices equal to the desired cluster size for the application,
wherein the desired cluster size is at least two.

17. A method according to claim 16, further comprising establishing a translation layer for the subset of the set of available storage devices to map logical block addresses to physical block addresses on the subset of the set of available storage devices.

18. A method according to claim 15, wherein:
receiving a set of storage device requirements from an application at a Tenant-Aware Storage-Sharing Engine (TASTE) includes receiving the desired page size for the application; and
selecting a subset of the set of available storage devices to satisfy the set of storage device requirements from the application includes:
selecting storage devices from the set of available storage devices; and
configuring the selected storage devices to use the desired page size for the application.

19. A method according to claim 18, further comprising establishing a translation layer for the subset of the set of available storage devices to map logical block addresses to physical block addresses according to the desired page size.

20. A method according to claim 15, wherein:
receiving a set of storage device requirements from an application at a Tenant-Aware Storage-Sharing Engine (TASTE) includes receiving the desired redundancy for the application; and
selecting a subset of the set of available storage devices to satisfy the set of storage device requirements from the application includes selecting storage devices from the set of available storage devices such that each data may be stored on a number of storage devices, the number of storage devices at least as large as the desired redundancy for the application.

21. A method according to claim 20, further comprising establishing a translation layer for the subset of the set of available storage devices to manage a first storage device in the subset of the set of available storage devices as a replica of a second storage device in the subset of the set of available storage devices.

22. A method according to claim 15, wherein:
receiving a set of storage device requirements from an application at a Tenant-Aware Storage-Sharing Engine (TASTE) includes receiving the desired persistency for the application; and
selecting a subset of the set of available storage devices to satisfy the set of storage device requirements from the application includes configuring storage devices from the set of available storage devices such that data will be stored on the storage devices for a threshold the minimum amount of time according to the desired persistency for the application.

23. A method according to claim 22, further comprising establishing a translation layer for the subset of the set of available storage devices such that data on the subset of the set of available storage devices should not be invalidate for at least the minimum amount of time.

24. A method according to claim 15, wherein:
receiving a set of storage device requirements from an application at a Tenant-Aware Storage-Sharing Engine (TASTE) includes receiving a second desired persistency requirement for the application; and
selecting a subset of the set of available storage devices to satisfy the set of storage device requirements from the application includes selecting storage devices from the set of available storage devices such that data will be protected against a power failure.

25. A method according to claim 15, wherein:
receiving a set of storage device requirements from an application at a Tenant-Aware Storage-Sharing Engine (TASTE) includes receiving the desired security for the application; and
selecting a subset of the set of available storage devices to satisfy the set of storage device requirements from the application includes selecting storage devices from the set of available storage devices such that no storage device in the subset of the set of available storage devices stores the second data for the second application.

26. A method according to claim 15, wherein:
receiving a set of storage device requirements from an application at a Tenant-Aware Storage-Sharing Engine (TASTE) includes receiving a migration command for the application; and
selecting a subset of the set of available storage devices to satisfy the set of storage device requirements from the application includes:
identifying a storage device whose data is to be migrated;
selecting a second storage device from the set of available storage devices; and
migrating data from the storage device to the second storage device.

27. An article, comprising a tangible storage medium, the tangible storage medium having stored thereon non-transitory instructions that, when executed by a machine, result in:

receiving a set of storage device requirements from an application at a Tenant-Aware Storage-Sharing Engine (TASTE), the storage device requirements drawn from a set including a desired capacity, a desired bandwidth, a desired latency, a desired cluster size, a desired page size, a desired redundancy, a desired parallelism, a desired persistency, and a desired security;
identifying a set of available storage devices;
selecting a subset of the set of available storage devices to satisfy the set of storage device requirements from the application using information about the set of available storage devices; and
allocating storage for the application using the selected subset of the set of available storage devices that satisfy the storage device requirements,
wherein:
the set of available storage devices includes at least two physical storage devices;
the desired capacity includes a capacity required by the application;
the desired bandwidth includes a minimum bandwidth required by the application;
the desired latency includes a maximum latency tolerated by the application;
the desired cluster size includes a cluster number of the storage devices to be assigned to the application;
the desired page size includes a size for each page in the storage devices assigned to the application;
the desired redundancy includes a redundancy number indicating how many copies of each datum stored by the application should be stored in the set of available storage devices;
the desired parallelism includes a parallelism number indicating how many storage devices may be combined into a virtual storage device assigned to the application;
the desired persistency includes a minimum amount of time that data for the application may be stored on the storage devices assigned to the application before being erased; and
the desired security includes an identifier of a second application such that data for the application is not stored on a common storage device with second data for the second application.

28. An article according to claim 27, wherein:
receiving a set of storage device requirements from an application at a Tenant-Aware Storage-Sharing Engine (TASTE) includes receiving the desired cluster size for the application; and
selecting a subset of the set of available storage devices to satisfy the set of storage device requirements from the application includes selecting storage devices from the set of available storage devices, a number of storage devices in the subset of available storage devices equal to the desired cluster size for the application,
wherein the desired cluster size is at least two.

29. An article according to claim 28, further comprising establishing a translation layer for the subset of the set of available storage devices to map logical block addresses to physical block addresses on the subset of the set of available storage devices.

30. An article according to claim 27, wherein:
receiving a set of storage device requirements from an application at a Tenant-Aware Storage-Sharing Engine (TASTE) includes receiving the desired redundancy for the application; and selecting a subset of the set of available storage devices to satisfy the set of storage device requirements from the application includes selecting storage devices from the set of available storage devices each data may be stored on a number of storage devices, the number of storage devices at least as large as the desired redundancy for the application.

31. An article according to claim 30, further comprising establishing a translation layer for the subset of the set of available storage devices to manage a first storage device in the subset of the set of available storage devices as a replica of a second storage device in the subset of the set of available storage devices.

* * * * *